(12) United States Patent
Meyers

(10) Patent No.: US 12,049,105 B2
(45) Date of Patent: *Jul. 30, 2024

(54) ALL-TERRAIN LOAD TRANSPORT SYSTEM

(71) Applicant: Albert Michael Meyers, Goodyear, AZ (US)

(72) Inventor: Albert Michael Meyers, Goodyear, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,663

(22) Filed: Apr. 3, 2023

(65) Prior Publication Data

US 2023/0241913 A1    Aug. 3, 2023

Related U.S. Application Data

(63) Continuation of application No. 17/378,656, filed on Jul. 17, 2021, now Pat. No. 11,633,982.

(51) Int. Cl.
*B60B 33/00* (2006.01)
*B60B 33/08* (2006.01)

(52) U.S. Cl.
CPC .......... *B60B 33/0028* (2013.01); *B60B 33/08* (2013.01); *B60B 2200/43* (2013.01); *B60B 2200/49* (2013.01); *B60B 2360/50* (2013.01); *B60B 2380/14* (2013.01); *B60B 2900/5112* (2013.01); *B60B 2900/551* (2013.01)

(58) Field of Classification Search
CPC ............... B60B 33/0028; B60B 33/08; B60B 2200/43; B60B 2200/49; B60B 2360/50; B60B 2900/5112; B60B 2900/551; B60B 19/003; B60B 19/14
See application file for complete search history.

(56) References Cited

U.S. PATENT DOCUMENTS

| 2,537,554 | A | * | 1/1951 | Seely | ..................... | B66F 13/00 |
| | | | | | | 254/1 |
| 2,627,425 | A | * | 2/1953 | McNamara | .......... | B62B 5/0083 |
| | | | | | | 280/62 |
| 3,091,158 | A | * | 5/1963 | Bunger | ................. | E04F 21/248 |
| | | | | | | 404/112 |
| 3,452,380 | A | * | 7/1969 | Walther | ............. | A47L 11/4072 |
| | | | | | | 15/49.1 |

(Continued)

*Primary Examiner* — Christine M Mills
*Assistant Examiner* — Matthew J Sullivan
(74) *Attorney, Agent, or Firm* — Ashok Tankha

(57) ABSTRACT

An all-terrain load transport system including a cylindrical first base member and at least three pairs of arms is provided. A handle is removably attached to an attachment member disposed on the cylindrical first base member. The cylindrical first base member defines a space for receiving at least one piece of accessory equipment. Each pair of the three pairs of arms defines a wheel support assembly at an end of each pair distal from an outer periphery of the cylindrical first base member. The three pairs of arms are detachably attached to the outer periphery of the cylindrical first base member. The wheel support assembly includes a cylindrical second base member defining a space for receiving a spherical wheel. The spherical wheel moves omnidirectionally within the defined space. Roller bearings positioned along an inner periphery of the cylindrical second base member facilitate the omnidirectional movement of the spherical wheel.

14 Claims, 21 Drawing Sheets

(56) References Cited

U.S. PATENT DOCUMENTS

| | | | | |
|---|---|---|---|---|
| 3,527,470 | A * | 9/1970 | Ord | B62B 5/0083 280/79.2 |
| 3,744,083 | A * | 7/1973 | Jenkins | F16C 29/046 16/26 |
| RE34,433 | E * | 11/1993 | Heiligenthal | B60B 33/025 16/35 R |
| 5,419,008 | A * | 5/1995 | West | B25J 5/005 16/25 |
| 5,507,069 | A * | 4/1996 | Willis | B60B 33/0015 16/31 R |
| 5,655,259 | A * | 8/1997 | Look | B60B 33/0002 16/45 |
| 6,134,747 | A * | 10/2000 | Leibman | B60B 33/0002 16/24 |
| 7,017,228 | B2 * | 3/2006 | Silverstein | B60B 33/0081 16/39 |
| 7,146,683 | B1 * | 12/2006 | Willis | B60B 33/0028 16/31 R |
| 7,506,405 | B2 * | 3/2009 | Willis | B60B 33/0002 280/79.11 |
| 7,845,656 | B2 * | 12/2010 | Thompson | B25H 3/00 280/47.35 |
| D636,140 | S * | 4/2011 | Cavanaugh | D34/23 |
| 8,827,879 | B2 * | 9/2014 | Nicholas | A63B 23/0355 482/141 |
| 9,199,117 | B1 * | 12/2015 | Nicholas | A63B 21/068 |
| 9,796,213 | B1 * | 10/2017 | Menard | B60B 19/003 |
| 9,950,564 | B2 * | 4/2018 | Willis | B60B 33/0042 |
| 9,975,215 | B2 * | 5/2018 | Mollone | B24B 23/028 |
| 10,286,943 | B1 * | 5/2019 | Greenblatt | B65D 19/42 |
| 10,875,359 | B2 * | 12/2020 | Monteiro De Barros | B60B 33/08 |
| 11,241,910 | B2 * | 2/2022 | Wilbur | B60B 33/0063 |
| 2005/0212243 | A1 * | 9/2005 | Terry | B62B 5/0083 280/79.11 |
| 2007/0039786 | A1 * | 2/2007 | Willis | B60B 33/0089 188/19 |
| 2007/0220704 | A1 * | 9/2007 | Willis | B60B 33/0057 16/47 |
| 2008/0148514 | A1 * | 6/2008 | Hancock | B60B 33/0007 16/21 |
| 2011/0023268 | A1 * | 2/2011 | Smith | B60B 33/0018 16/47 |
| 2018/0201063 | A1 * | 7/2018 | Monteiro De Barros | B60B 33/0065 |
| 2019/0144036 | A1 * | 5/2019 | Geiger | B62D 15/00 180/6.5 |
| 2019/0145471 | A1 * | 5/2019 | Carbone | F16D 49/10 180/210 |
| 2020/0122505 | A1 * | 4/2020 | Zona | B62K 5/08 |
| 2021/0086556 | A1 * | 3/2021 | Sweeten | B60B 33/08 |
| 2022/0009571 | A1 * | 1/2022 | Miyamoto | B60B 19/14 |
| 2022/0063330 | A1 * | 3/2022 | Monteleone | B60B 33/0039 |

* cited by examiner

ALL-TERRAIN LOAD TRANSPORT SYSTEM

CROSS-REFERENCE TO RELATED APPLICATIONS

This is a continuation application of non-provisional patent application Ser. No. 17/378,656 titled "All-terrain load transport system", filed in the United States Patent and Trademark Office on Jul. 17, 2021. The specification of the above referenced patent application is incorporated herein by reference in its entirety.

BACKGROUND

Most load transport systems, for example, carts, platform dollies, trollies, etc., cannot efficiently maneuver on uneven or rough terrains. Although load transport systems may be able to move heavy loads, their movement is often obstructed by small surface irregularities. For example, when a load transport system is transporting a heavy load, an object as thin as a coin may obstruct forward movement of the load transport system. Forward movement may also be obstructed by an abrupt upward change in the plane of travel of the load transport system. For example, when an irregular surface or an inclined surface is encountered, the entire load carried by the load transport system is shifted to one or more rollers still in contact with the surface over which the load is being moved. The rollers still in contact with the surface must be able to support the weight of the entire load carried by the load transport system, necessitating the use of large rollers. Moreover, due to the small diameter of the rollers typically employed in load transport systems, small irregularities in the surface over which the load transport system traverses will have a magnified effect upon the amount of energy required to move the loaded load transport system over the irregular or inclined surface. To overcome these drawbacks, a load transport system provided with suitably large, rigid roller wheels may be used. However, such roller wheels may dig into the contact surface if the surface is uneven or irregular. Accordingly, there is a need for a cart or load transport system that traverses even and uneven terrains with no damage or minimal damage to the contact surface or the roller wheel of the cart or load transport system.

Conventionally, most load transport systems are not expandable or adjustable to handle different sized loads and are not multi-functional, making it difficult to load accessories or equipment of varied sizes and shapes, thereby increasing the probability of the load falling off the load transport system. Therefore, there is a need for a cart or load transport system that allows mounting of equipment or accessories or loads of varying sizes and shapes. A drawback of conventional carts includes exertion of frictional force or resistive force on the roller wheels by a support assembly of the roller wheels. Typical roller wheel assemblies allow movement in a single direction or in only two directions within their roller wheel housings, which leads to increased friction on the external surface of the roller wheels, thereby causing wear and tear and reducing the life of the roller wheels. Therefore, there is a need for a load transport system comprising a roller wheel assembly having improved freedom of movement with reduced friction.

Furthermore, other challenges in conventional load transport systems result from the use of steel wheels or rollers in their construction. The steel wheels may damage the surface over which they travel, especially over tiled surfaces typically encountered in office buildings and the like. Another drawback with steel wheels is their ability to transmit the unevenness of the surface over which they travel to the equipment in the load transport system in the form of mechanical vibrations which may not be tolerated by sensitive equipment such as electronic equipment, computers, etc. Therefore, there is a need for a load transport system comprising a roller wheel assembly that exerts minimal force on a floor or ground surface and reduces the impact of uneven ground surfaces on the mounted equipment.

Hence, there is a long-felt need for a load transport system that traverses even and uneven terrains, with no damage or minimal damage to the contact surface, or to the roller wheel of the load transport system. Moreover, there is a need for a load transport system that allows mounting of equipment or accessories or loads of varying sizes and shapes on the load transport system. Furthermore, there is a need for a load transport system comprising a roller wheel assembly having improved freedom of movement with reduced friction. Furthermore, there is a need for a load transport system comprising a roller wheel assembly that exerts minimal force on a floor or ground surface and reduces the impact of uneven ground surfaces on equipment mounted on the load transport system.

SUMMARY

This summary is provided to introduce a selection of concepts in a simplified form that are further disclosed in the detailed description. This summary is not intended to determine the scope of the claimed subject matter.

The all-terrain load transport system addresses the above-recited need for a load transport system that traverses even and uneven terrains with no damage or minimal damage to a contact surface or to a roller wheel of the load transport system. The all-terrain load transport system addresses the need for a cart or load transport system that allows mounting of equipment or accessories or loads of varying sizes and shapes thereon. Furthermore, the all-terrain load transport system addresses the need for a load transport system comprising a roller wheel assembly having improved freedom of movement with reduced friction. Furthermore, the all-terrain load transport system addresses the need for a roller wheel assembly to exert minimal force on a floor or ground surface over which the roller wheel assembly traverses and to reduce the impact of uneven ground surfaces on equipment mounted on the load transport system.

The all-terrain load transport system disclosed herein comprises a substantially cylindrical first base member and at least three pairs of arms. The substantially cylindrical first base member defines a space for receiving at least one piece of accessory equipment. The three pairs of arms are detachably attached to an outer periphery of the substantially cylindrical first base member by an attachment or connection means that allows the arms to be removable. The attachment or connection means is, for example, a male attachment member configured to be inserted into a socket defined within the substantially cylindrical first base member, a ball and socket joint, etc. Each pair of the three pairs of arms defines a wheel support assembly at an end of each pair of the three pairs of arms distal from the outer periphery of the substantially cylindrical first base member. In an embodiment, each wheel support assembly comprises a substantially cylindrical second base member, a spherical wheel, and roller bearings. The substantially cylindrical second base member extends from the end of each pair of the three pairs of arms. Each substantially cylindrical second base member defines a space for receiving the spherical wheel. The spherical wheel is configured to move omnidirectionally within the space. The omnidirectional movement of the spherical wheel is facilitated by multiple roller bearings positioned along an inner periphery of the substantially cylindrical second base member. The spherical wheel is made of a resilient material, for example, rubber, silicone, or a combination of rubber and silicone.

In an embodiment, each wheel support assembly further comprises a top dust seal and a bottom dust seal. The top dust seal and the bottom dust seal are configured to prevent an ingress of particulate matter into the space defined by the substantially cylindrical second base member. In an embodiment, the top dust seal is seated proximal to a top surface of the substantially cylindrical second base member and the bottom dust seal is seated proximal to a bottom surface of the substantially cylindrical second base member. In an embodiment, the wheel support assembly of each pair of the three pairs of arms is positioned at vertices of an imaginary polygon, for example, an equilateral triangle, coaxial to a longitudinal axis of the substantially cylindrical first base member.

In an embodiment, the all-terrain load transport system further comprises a handle removably attached to an attachment member disposed on the outer periphery of the substantially cylindrical first base member. The handle facilitates maneuvering of the all-terrain load transport system. In an embodiment, several attachment members are similarly disposed at various locations along the outer periphery of the substantially cylindrical first base member for removable attaching one or more pieces of accessory equipment to the all-terrain load transport system.

BRIEF DESCRIPTION OF THE DRAWINGS

The foregoing summary, as well as the following detailed description, is better understood when read in conjunction with the appended drawings. For illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Figure 1A:
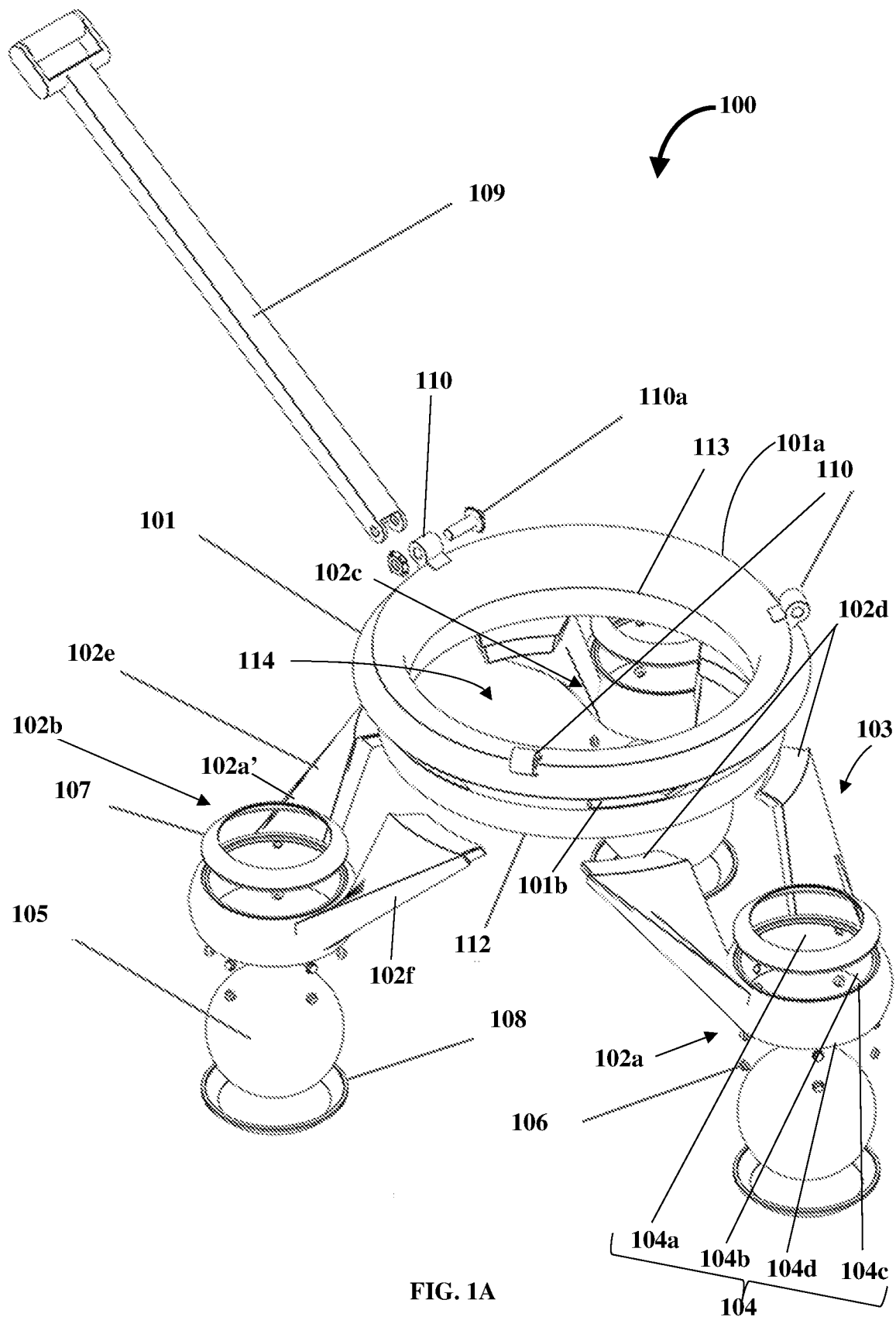
FIG. 1A exemplarily illustrates an exploded, top perspective view of an all-terrain load transport system.

FIG. 1A exemplarily illustrates an exploded, top perspective view of an all-terrain load transport system 100. The all-terrain load transport system 100 comprises a substantially cylindrical first base member 101 and at least three pairs of arms 102a, 102b, and 102c. As used herein, "substantially cylindrical" refers to a geometrical configuration such as right circular cylindrical, oblique cylindrical, elliptical cylindrical, hollow cylindrical, and the like. Moreover, "substantially cylindrical" configurations may also be construed to include cylindrical members having a circular cross-section, an oval cross-section, a conical cross-section, and similar variants that are known in the art. In an embodiment, the substantially cylindrical first base member 101 is, for example, a hoop-type structure or a ring-type structure. Furthermore, the height or thickness of the substantially cylindrical first base member 101 is different for different implementations of the all-terrain load transport system 100. For example, an all-terrain load transport system 100 configured to receive heavy equipment is of a greater height and thickness than a similar all-terrain load transport system 100 configured to receive light equipment. As used herein, "height or thickness" of the substantially cylindrical first base member 101 refers to the height or thickness of a lateral surface of the substantially cylindrical first base member 101. The substantially cylindrical first base member 101 defines a space 114 for receiving at least one piece of accessory equipment, for example, any one of a welding accessory 600, a vacuum cleaning accessory 700, a pressure washing accessory 800, an airless paint spraying accessory 900, a beverage cooling accessory 1000, an air compressor accessory 1100, a wheelbarrow accessory 1200, a trash can accessory 1300, etc., as exemplarily illustrated in FIGS. 6-13.

Each pair of the three pairs of arms 102a, 102b, and 102c of the all-terrain load transport system 100 defines a wheel support assembly 103. The three pairs of arms 102a, 102b, and 102c are detachably attached to an outer periphery 101a of the substantially cylindrical first base member 101. As used herein, "detachably attached" refers to a method of attachment or connection that allows the arms 102a, 102b, and 102c to be removable. For example, the three pairs of arms 102a, 102b, and 102c are detachably attached to the outer periphery 101a of the substantially cylindrical first base member 101 using male attachment members 102d configured to be inserted into sockets 101b defined within the substantially cylindrical first base member 101. In an embodiment, the male attachment member 102d is one of a projection, a pin, a threaded bolt, an alignment post, a mounting boss, a sheet metal tab connector, a ball and socket joint, etc. Correspondingly, the socket 101b is a female connecting member such as one of a recess, a plain socket, a threaded nut, an alignment hole, a mounting recess, a sheet metal slot connector, etc. In an embodiment, the male attachment members 102d are wedge-shaped and the sockets 101b are shaped correspondingly to receive the wedge-shaped male attachment members 102d.

The wheel support assembly 103 is defined at an end 102a' of each pair of the three pairs of the arms 102a, 102b, and 102c distal from the outer periphery 101a of the substantially cylindrical first base member 101. Each wheel support assembly 103 comprises a substantially cylindrical second base member 104, a spherical wheel 105, and roller bearings 106. The substantially cylindrical second base member 104 extends from the end 102a' of each pair of the three pairs of arms 102a, 102b, and 102c. Each substantially cylindrical second base member 104 defines a space 104a for receiving a spherical wheel 105. The spherical wheel 105 is configured to move omnidirectionally within the space 104a. The omnidirectional movement of the spherical wheel 105 is facilitated by multiple roller bearings 106 positioned along an inner periphery 104b of the substantially cylindrical second base member 104. In an embodiment, the wheel support assembly 103 further comprises a top dust seal 107 and a bottom dust seal 108. In an embodiment, the top dust seal 107 is seated proximal to a top surface 104c of the substantially cylindrical second base member 104, and the bottom dust seal 108 is seated proximal to a bottom surface 104d of the substantially cylindrical second base member 104. The top dust seal 107 and the bottom dust seal 108 are configured to prevent ingress of particulate matter, for example, dust, into the space 104a defined by the substantially cylindrical second base member 104. Each of the three pairs of arms 102a, 102b, and 102c comprises a pair of angled members 102e and 102f as exemplarily illustrated in FIGS. 1A-1C and FIGS. 1E-1G, that projects laterally from the side of the substantially cylindrical second base member 104. The pair of angled members 102e and 102f is angled with respect to a plane of the substantially cylindrical second base member 104.

In an embodiment, the all-terrain load transport system 100 further comprises a handle 109 removably attached to an attachment member 110 disposed on the outer periphery 101a of the substantially cylindrical first base member 101. The handle 109 is removably attached to the attachment member 110 using a fastener 110a. The handle 109 facilitates maneuvering of the all-terrain load transport system 100. Several supplementary attachment members 110 are similarly disposed at various locations along the outer periphery 101a of the substantially cylindrical first base member 101 for removably attaching one or more pieces of accessory equipment to the all-terrain load transport system 100.

Figure 1B:
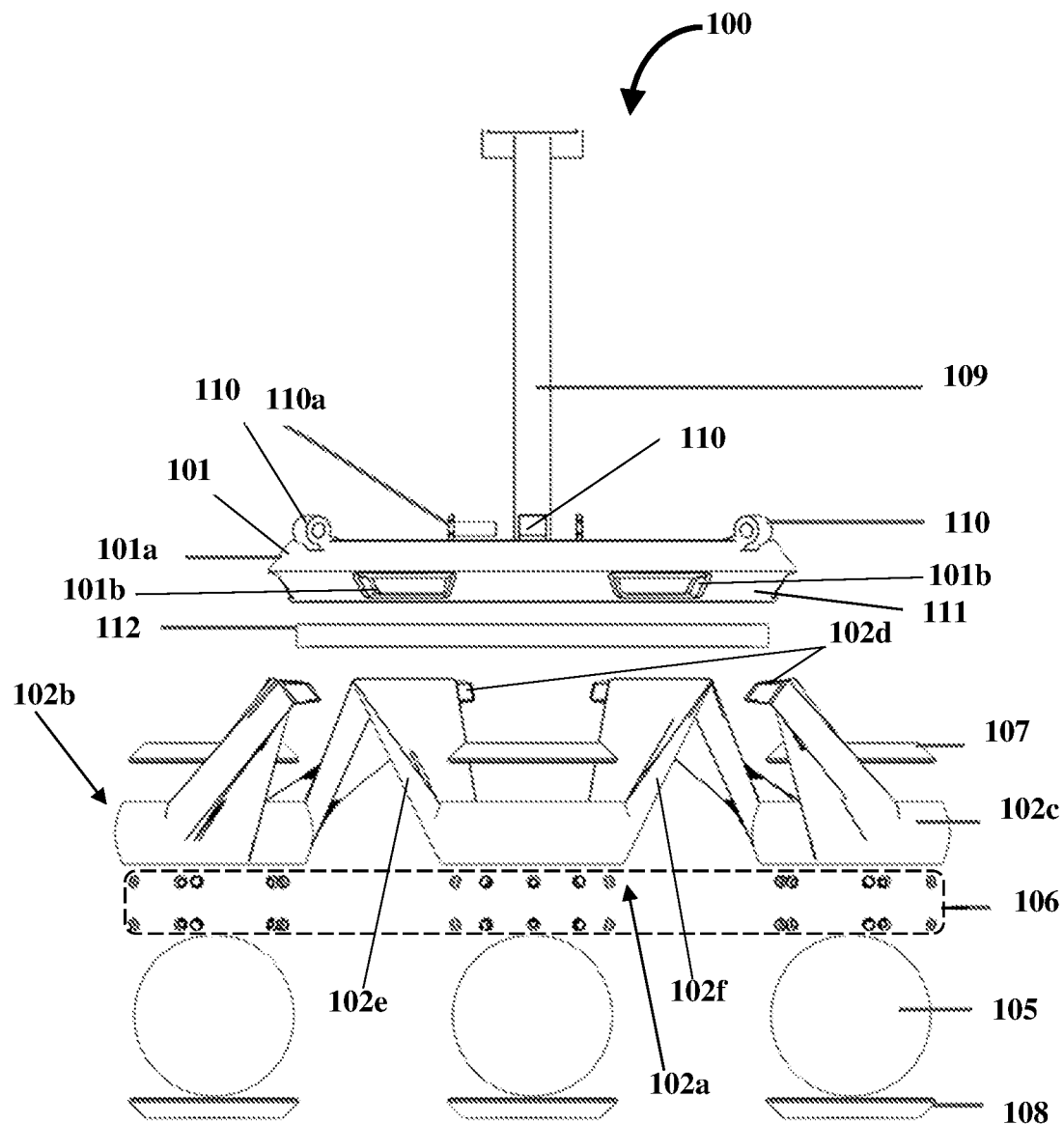
FIG. 1B exemplarily illustrates an exploded, front view of the all-terrain load transport system.

FIG. 1B exemplarily illustrates an exploded, front view of the all-terrain load transport system 100. As exemplarily illustrated in FIG. 1B, the substantially cylindrical first base member 101 comprises an interior support ring 112 attached to the bottom end 111 of the substantially cylindrical first base member 101. The interior support ring 112 is, for example, made of metal to increase the strength of the substantially cylindrical first base member 101. The interior support ring 112 is coaxial to the substantially cylindrical first base member 101. As exemplarily illustrated in FIGS. 1A-1B, each of the arms 102a, 102b, and 102c of the all-terrain load transport system 100 comprises, for example, about ten roller bearings 106. About five roller bearings 106 are disposed proximal to the top dust seal 107, and about five roller bearings 106 are disposed proximal to the bottom dust seal 108. In an embodiment, the roller bearings 106 are of a roller-type construction. In another embodiment, the roller bearings 106 are of a ball-type construction.

Figure 1C:
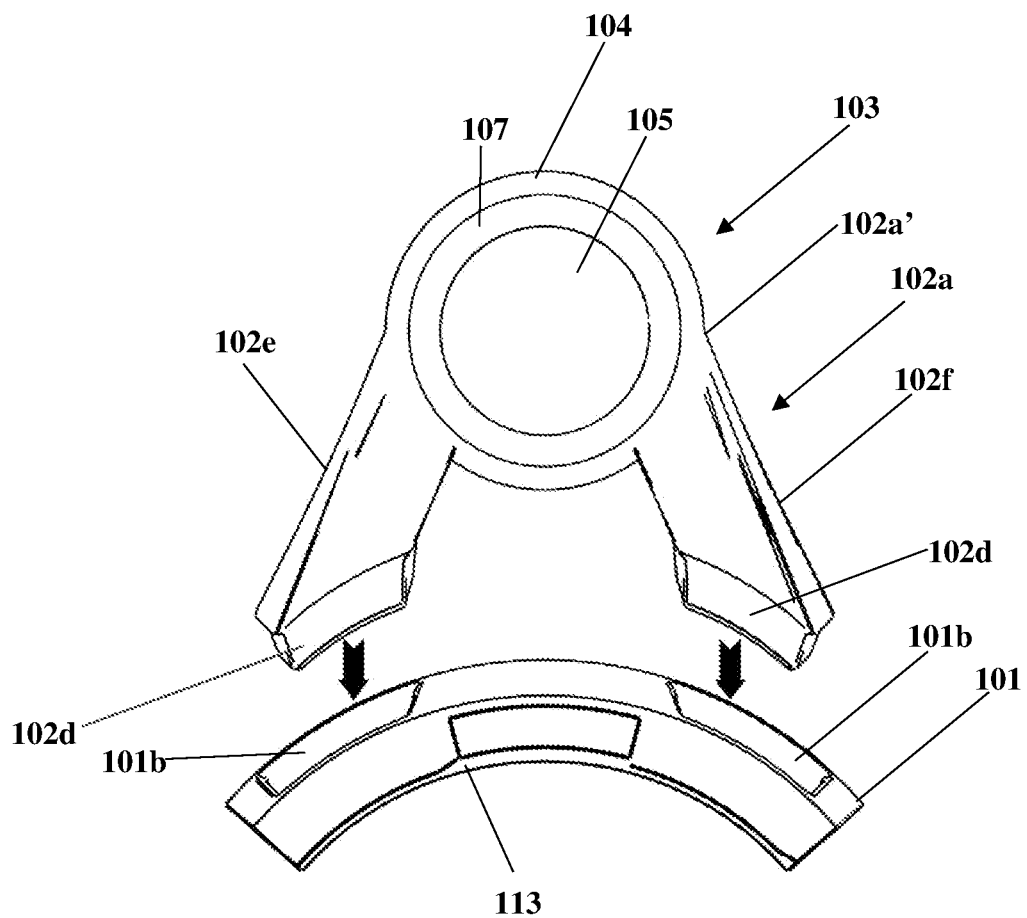
FIG. 1C exemplarily illustrates a top view of a wheel support assembly being affixed to a substantially cylindrical first base member of the all-terrain load transport system.

FIG. 1C exemplarily illustrates a top view of a wheel support assembly 103 being affixed to the substantially cylindrical first base member 101 of the all-terrain load transport system 100 shown in FIGS. 1A-1B and FIGS. 2-3. One pair of arms 102a is shown as being detachably attached to the substantially cylindrical first base member 101 in FIG. 1C. The arms 102a comprise angled members 102e and 102f and male attachment members 102d, which allow the arms 102a to be removable. For example, the male attachment members 102d are configured to be inserted into corresponding sockets 101b defined within the substantially cylindrical first base member 101. Correspondingly, each socket 101b is a female connecting member, for example, one of a recess, a plain socket, a threaded nut, an alignment hole, a mounting recess, a sheet metal slot connector, etc. In an embodiment, the male attachment members 102d are wedge-shaped and the corresponding sockets 101b are shaped correspondingly to receive the wedge-shaped male attachment members 102d as exemplarily illustrated in FIG. 1C. Moreover, the pair of arms 102a defines the wheel support assembly 103 at an end 102a' of the pair of the arms 102a distal from the substantially cylindrical first base member 101.

Figure 1D:
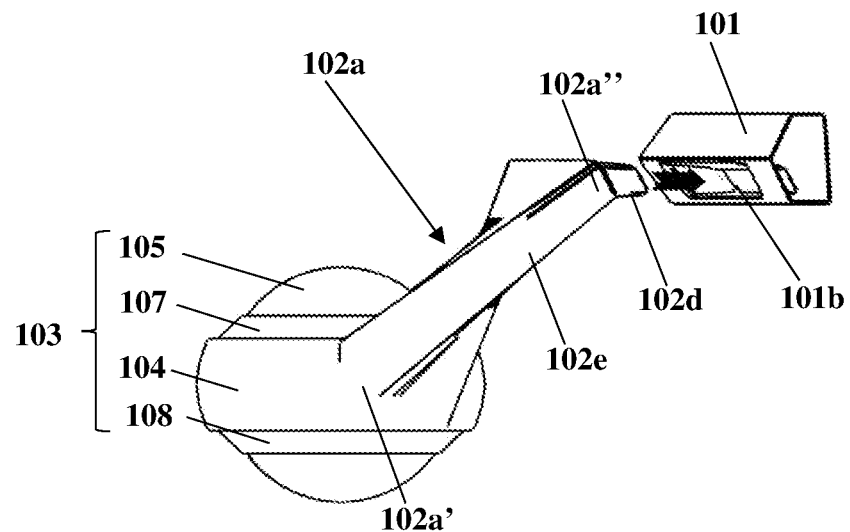
FIG. 1D exemplarily illustrates a right-side view of the wheel support assembly being affixed to the substantially cylindrical first base member of the all-terrain load transport system.

FIG. 1D exemplarily illustrates a right-side view of the wheel support assembly 103 being affixed to the substantially cylindrical first base member 101 of the all-terrain load transport system 100 shown in FIGS. 1A-1B and FIGS. 2-3. The wheel support assembly 103 comprising the substantially cylindrical second base member 104, the spherical wheel 105, the roller bearings 106 shown in FIGS. 1A-1B, the top dust seal 107, and the bottom dust seal 108, extends from the end 102a' of the arms 102a distal from the substantially cylindrical first base member 101. The substantially cylindrical second base member 104 extends from the end 102a' of the angled members 102e and 102f of the arms 102a. When the end 102a' of the angled member 102e is attached to the substantially cylindrical second base member 104, the angled member 102e undergoes a "quarter twist" along its length in a clockwise direction, between the end 102a' attached to the substantially cylindrical second base member 104 and the other end 102a" where the male attachment member 102d is located. Similarly, when the angled member 102f of the arm 102a is attached to the substantially cylindrical second base member 104, the angled member 102f undergoes a "quarter twist" along its length in an anticlockwise direction, between the one end 102a' attached to the substantially cylindrical second base member 104 and the other end 102a" where the male attachment member 102d is located. In an embodiment, the angled members 102e and 102f are inclined at an angle ranging, for example, between 15 degrees to 75 degrees relative to the ground surface. In one or more embodiments, the angled members 102e and 102f are retractable or extendable using mechanisms such as a telescopic means and the like. In other embodiments, the angled members 102e and 102f are selectively extendable or retractable based on an operator preference.

Figure 1E:
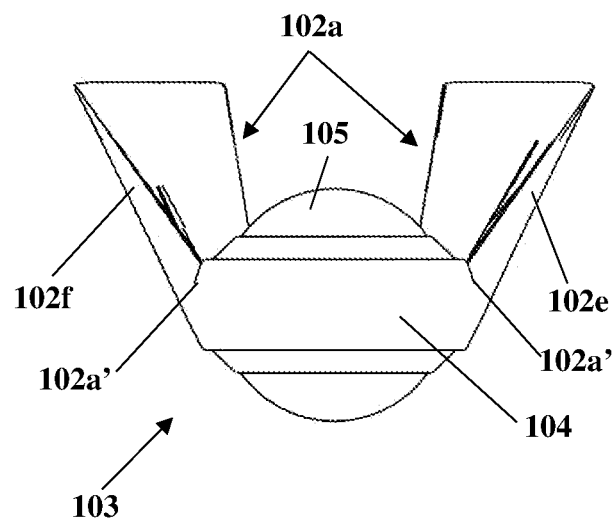
FIG. 1E exemplarily illustrates a front view of the wheel support assembly of the all-terrain load transport system.
Figure 1F:
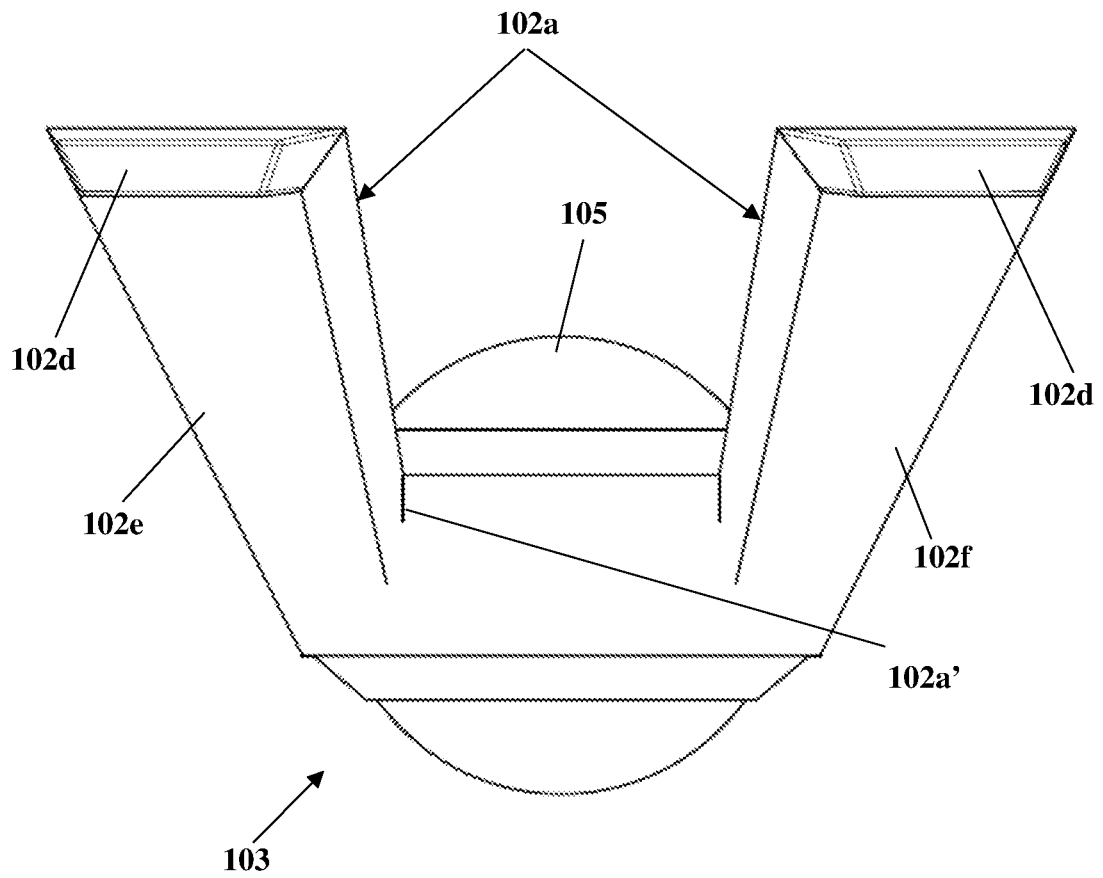
FIG. 1F exemplarily illustrates a rear view of the wheel support assembly of the all-terrain load transport system.
Figure 1G:
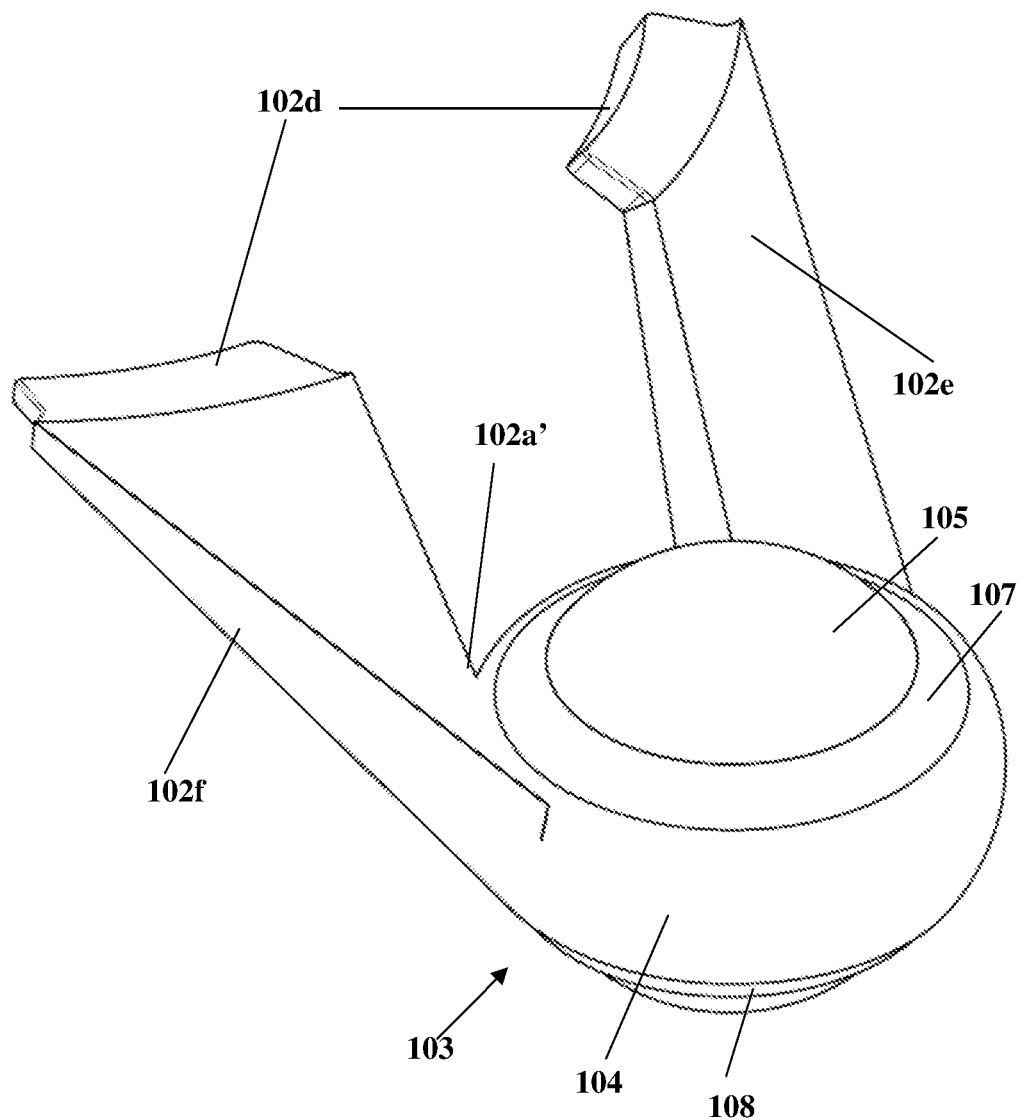
FIG. 1G exemplarily illustrates a rear perspective view of the wheel support assembly of the all-terrain load transport system.

FIG. 1E exemplarily illustrates a front view of the wheel support assembly 103 of the all-terrain load transport system 100 shown in FIGS. 1A-1B and FIGS. 2-3. FIG. 1E shows the wheel support assembly 103 extending from the ends 102a' of the arms 102a. FIG. 1F exemplarily illustrates a rear view of the wheel support assembly 103 of the all-terrain load transport system 100. FIG. 1G exemplarily illustrates a rear perspective view of the wheel support assembly 103 of the all-terrain load transport system 100.

Figure 1H:
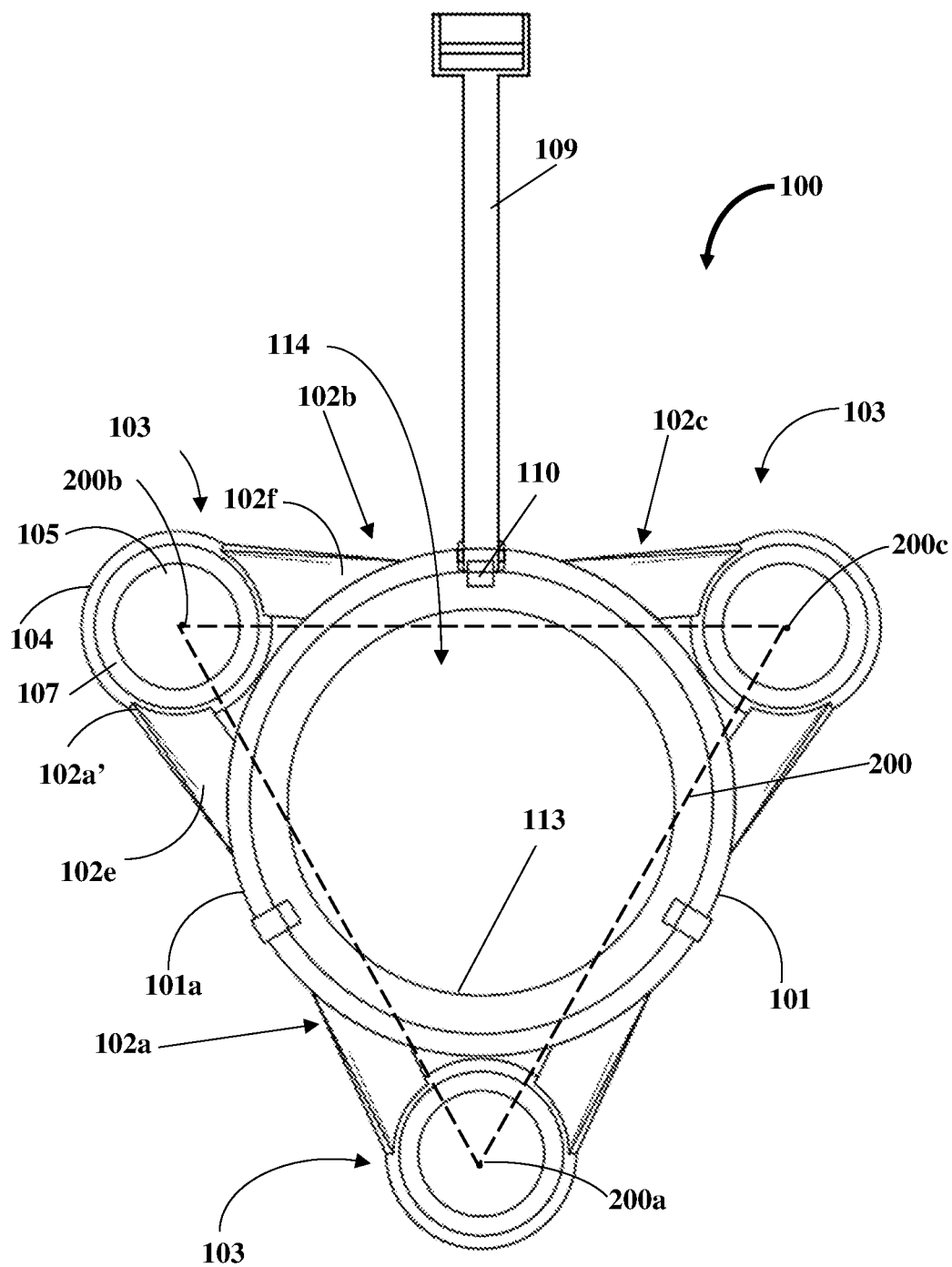
FIG. 1H exemplarily illustrates a top plan view of the all-terrain load transport system.

FIG. 1H exemplarily illustrates a top plan view of the all-terrain load transport system 100. The structure of the all-terrain load transport system 100 comprising the handle 109, the substantially cylindrical first base member 101, the three pairs of arms 102a, 102b, and 102c, and the corresponding wheel support assemblies 103 is disclosed in the detailed descriptions of FIGS. 1A-1G. Each of the pairs of arms 102a, 102b, and 102c comprises a pair of angled members 102e and 102f that project laterally from the sides of the substantially cylindrical second base member 104. As exemplarily illustrated in FIG. 1H, the wheel support assemblies 103 of the pairs of arms 102a, 102b, and 102c are positioned at vertices 200a, 200b, and 200c of an imaginary polygon 200 respectively. In an embodiment, the imaginary polygon 200 is an equilateral triangle. The pneumatic, omnidirectional wheel support assemblies 103 are evenly spaced in a triangular configuration. In alternative embodiments, the imaginary polygon 200 is a square, a pentagon, a hexagon, and similar variants. The number of wheel support assemblies 103 increase or decrease based on the structure of the imaginary polygon 200. As such, in the embodiments where the polygon is a square, the all-terrain load transport system 100 contains at least four wheel support assemblies 103. Alternatively, in embodiments where the imaginary polygon 200 is a pentagon, the all-terrain load transport system 100 contains at least five wheel support assemblies 103.

Figure 2:
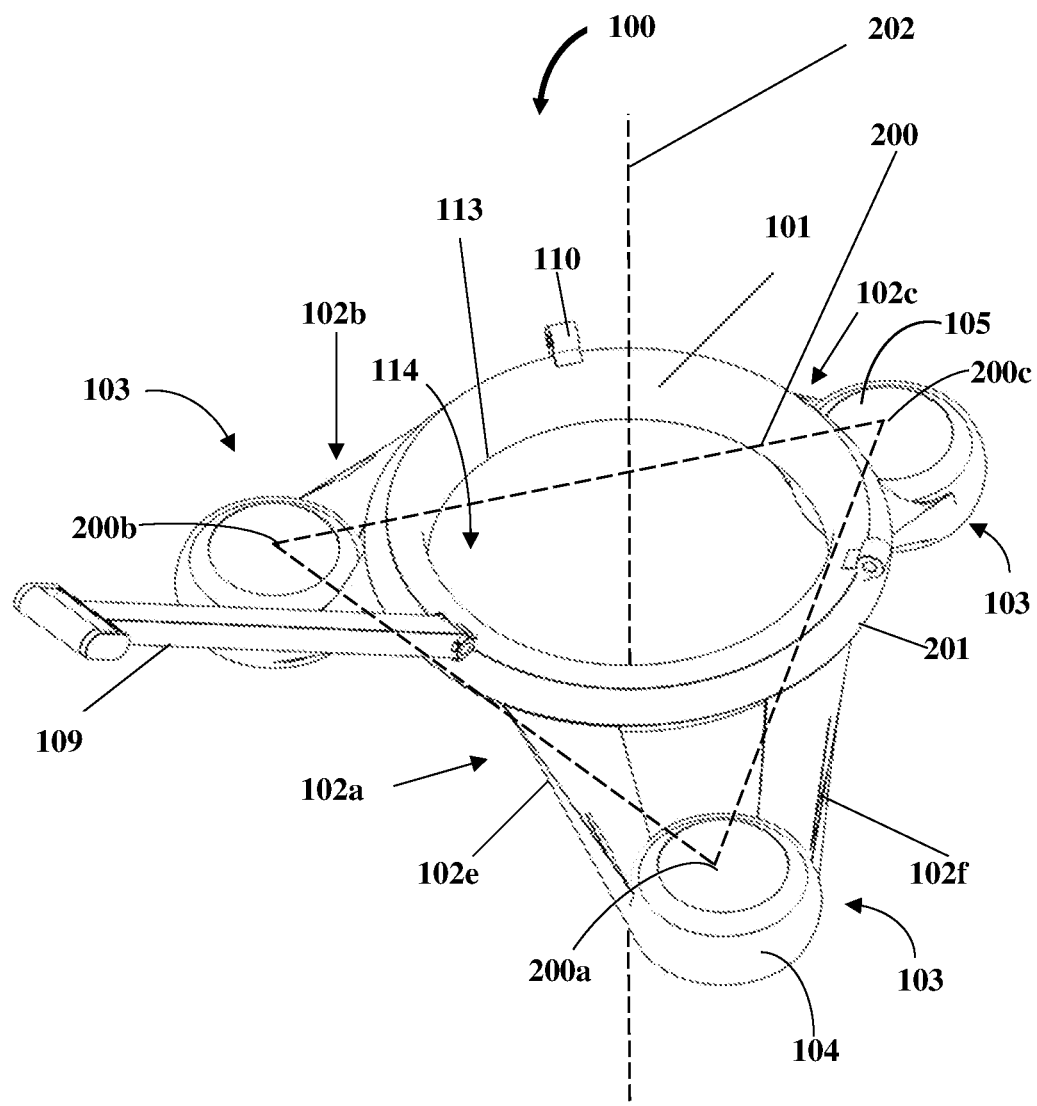
FIG. 2 exemplarily illustrates a top perspective view of the all-terrain load transport system.

FIG. 2 exemplarily illustrates a top perspective view of the all-terrain load transport system 100. As disclosed in the detailed description of FIG. 1A, the all-terrain load transport system 100 comprises the substantially cylindrical first base member 101, at least three pairs of arms 102a, 102b, and 102c, and the corresponding wheel support assemblies 103. The wheel support assemblies 103 are positioned at the vertices 200a, 200b, and 200c of an imaginary polygon 200 as disclosed in the detailed description of FIG. 1H. The imaginary polygon 200 is coaxial to a longitudinal axis 202 of the substantially cylindrical first base member 101. In an embodiment, non-roller parts, for example, the substantially cylindrical first base member 101, the three pairs of arms 102a, 102b, and 102c, the handle 109, etc., of the all-terrain load transport system 100, are made of conventional materials using conventional techniques. For example, the non-roller parts are made of cast steel, forged steel, or welded steel construction. If lightweight parts of less durability are required, these parts are constructed from plastic, for example, a fiber-reinforced plastic. Examples of suitable fibers for manufacturing the non-roller parts are boron, carbon, and glass. Examples of suitable plastics for manufacturing the non-roller parts are polyesters, polyurethanes, epoxides, and polyethers. In an embodiment, the spherical wheel 105 of each wheel support assembly 103 is constructed, for example, of steel, a resilient material, or an elastomer. In an embodiment, the elastomer is reinforced with a filler such as carbon black or is unreinforced. The elastomer used is, for example, natural rubber or a synthetic elastomer such as styrene-butadiene rubber, polyurethane rubber, neoprene rubber, or nitrile rubber. In another embodiment, the spherical wheel 105 is made of a non-marring material, for example, silicone or a combination of silicone and rubber for fragile flooring. The spherical wheel 105 is configured to move omnidirectionally within each wheel support assembly 103 with the assistance of roller bearings 106 to reduce friction.

Figure 3:
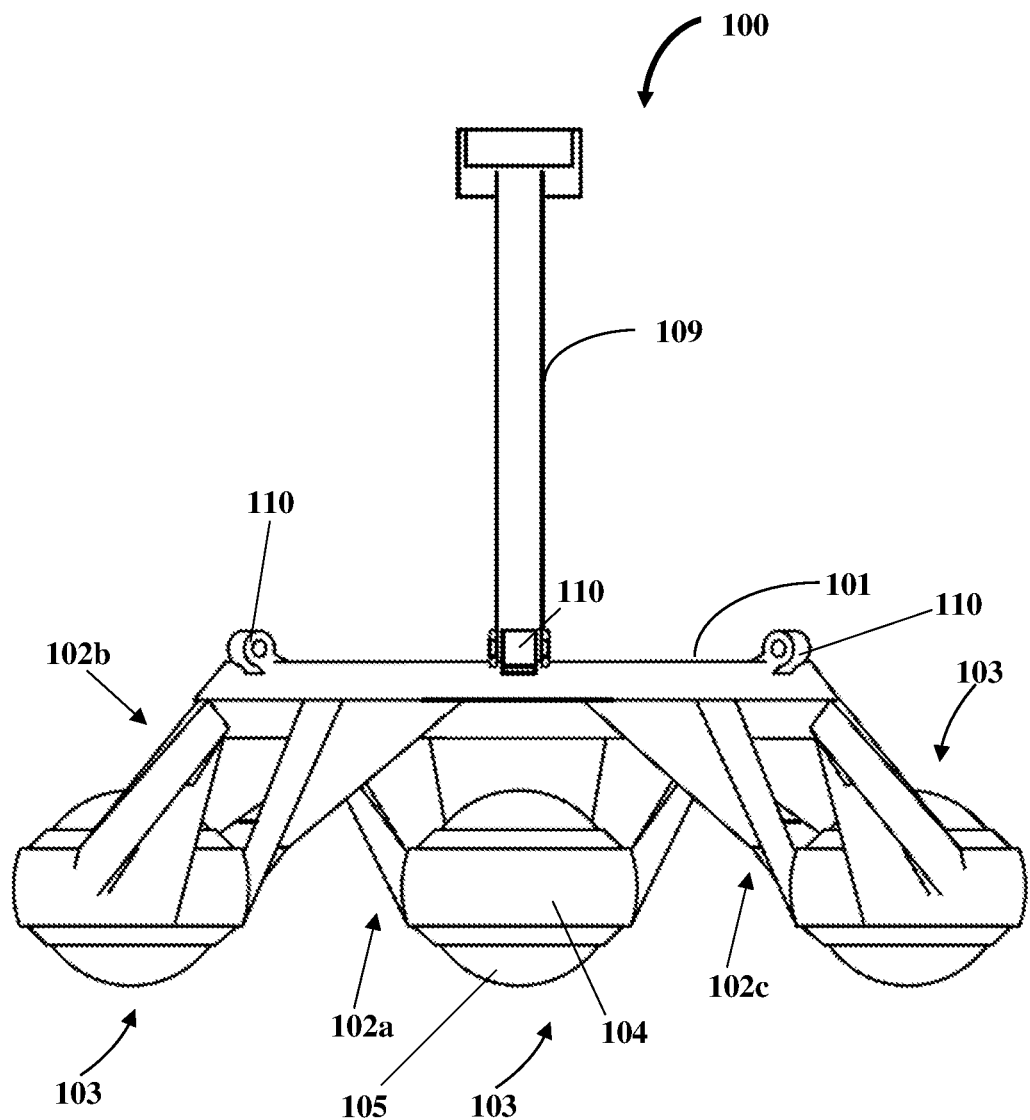
FIG. 3 exemplarily illustrates a front elevation view of the all-terrain load transport system.

FIG. 3 exemplarily illustrates a front elevation view of the all-terrain load transport system 100. As disclosed in the detailed description of FIG. 1A, the all-terrain load transport system 100 comprises the substantially cylindrical first base member 101, at least three pairs of arms 102a, 102b, and 102c, and the wheel support assembly 103 in each pair. Several attachment members 110 are disposed at various locations along the substantially cylindrical first base member 101 for removably attaching one or more accessory equipment to the all-terrain load transport system 100. In an embodiment, the handle 109 is secured to one of the attachment members 110 for maneuvering the all-terrain load transport system 100.

Figure 4A:
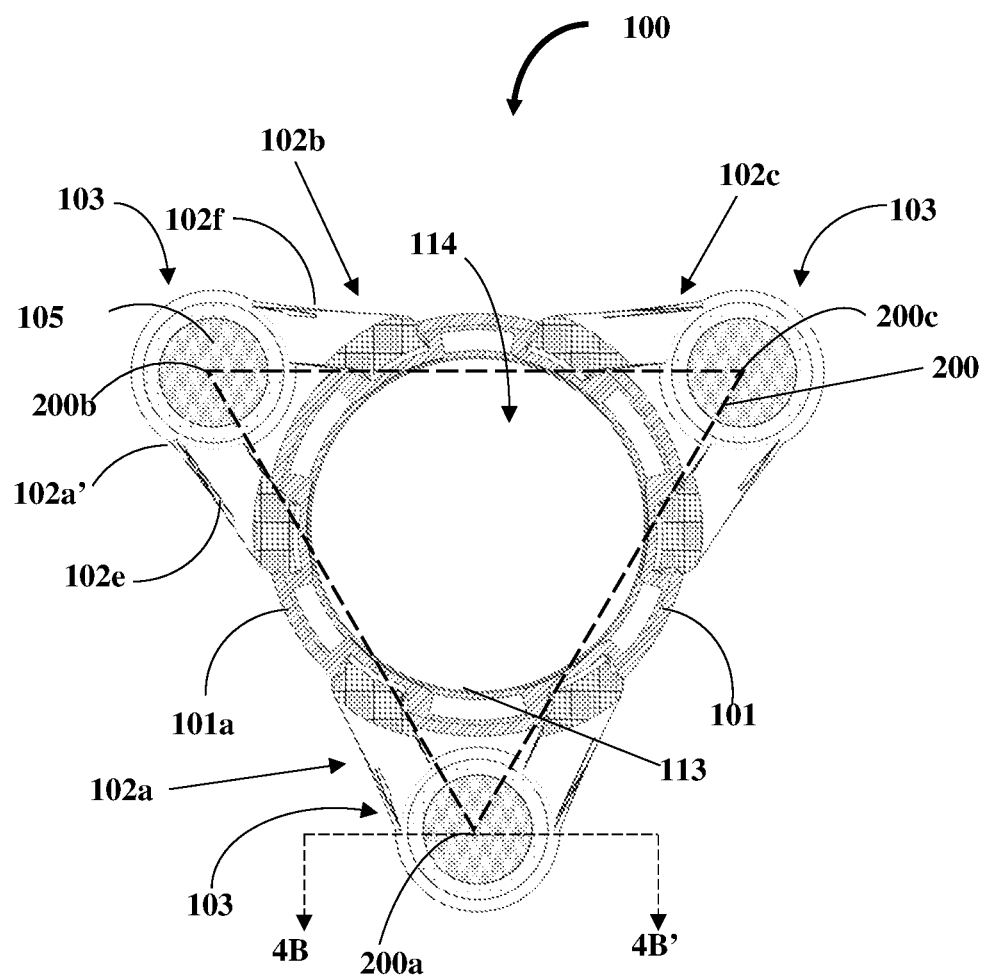
FIG. 4A exemplarily illustrates a top plan view of the all-terrain load transport system.
Figure 4B:
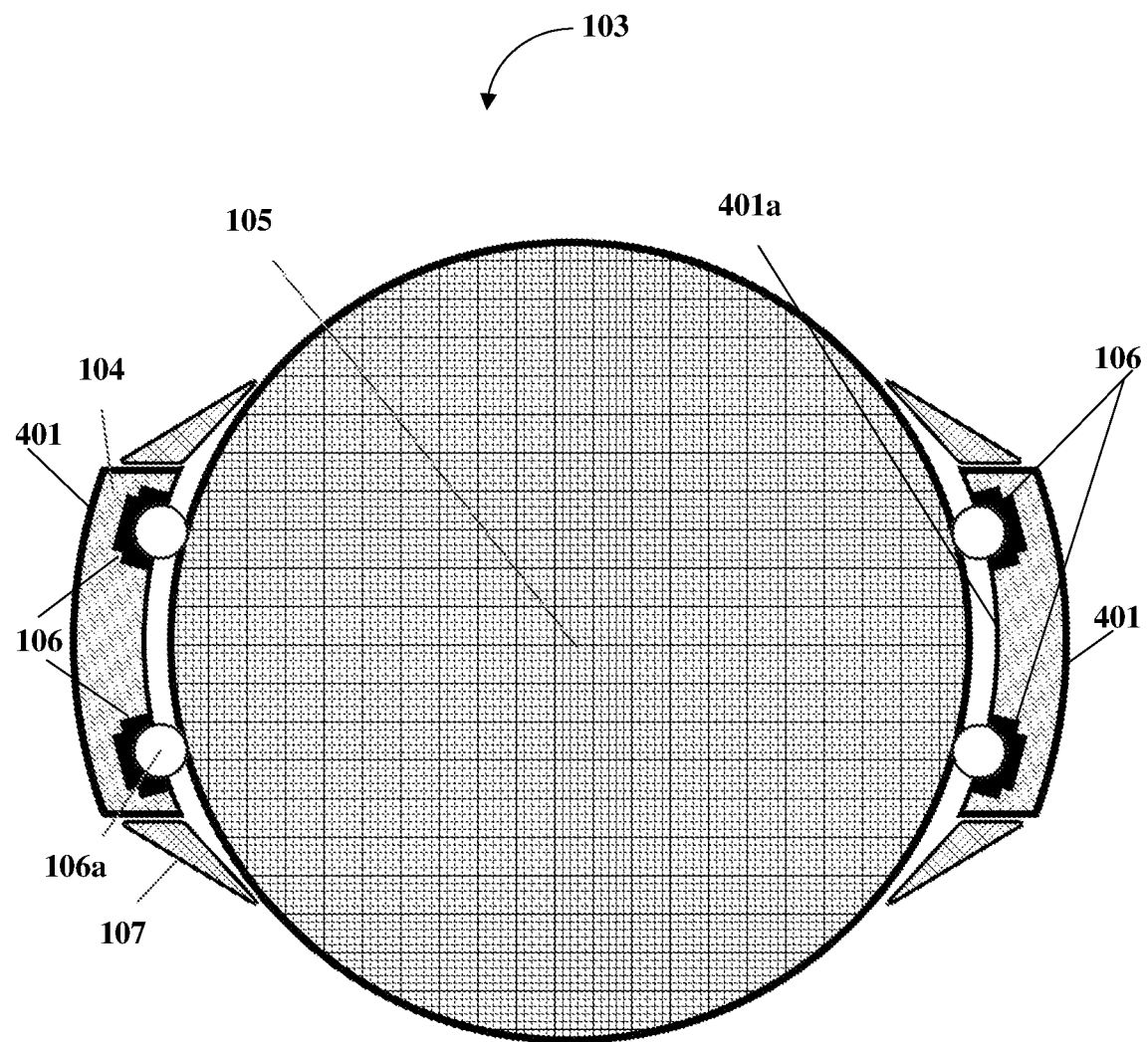
FIG. 4B exemplarily illustrates a cross-sectional view of the wheel support assembly of the all-terrain load transport system, where the cross-section is obtained along a line 4B-4B' shown in FIG. 4A.

FIG. 4A exemplarily illustrates a top plan view of the all-terrain load transport system 100. FIG. 4B exemplarily illustrates a cross-sectional view of the wheel support assembly 103 of the all-terrain load transport system 100, where the cross-section is obtained along a line 4B-4B' shown in FIG. 4A. The wheel support assemblies 103 are positioned at the vertices 200a, 200b, and 200c of the imaginary polygon 200 as disclosed in the detailed descriptions of FIG. 1H and FIG. 2. In the embodiment where the imaginary polygon 200 is an equilateral triangle, the pneumatic, omnidirectional wheel support assemblies 103 are evenly spaced in a triangular configuration. In an embodiment, pneumatic, omnidirectional spherical wheels 105 are disposed in the arms 102a, 102b, and 102c of the all-terrain load transport system 100 within their respective wheel support assemblies 103. The arms 102a, 102b, and 102c are attached outside the perimeter 201 of the substantially cylindrical first base member 101 as exemplarily illustrated in FIG. 2. Furthermore, the arms 102a, 102b, and 102c are attached to the bottom end 111 of the substantially cylindrical first base member 101 exemplarily illustrated in FIG. 1B, from where the arms 102a, 102b, and 102c extend outward and away from the longitudinal axis 202 of the substantially cylindrical first base member 101 illustrated in FIG. 2. Positioning the wheel support assemblies 103 outside the perimeter 201 of the substantially cylindrical first base member 101, attached to the ends 102a' of the arms 102a, 102b, and 102c increases the stability of the all-terrain load transport system 100 when the all-terrain load transport system 100 is in motion. Moreover, positioning the wheel support assemblies 103 outside the perimeter 201 of the substantially cylindrical first base member 101, on the arms 102a, 102b, and 102c, ensures that the center of gravity of the all-terrain load transport system 100 is proximal to or suspended in the center of the all-terrain load transport system 100, thereby positioning a gravitational load below a center point of each wheel support assembly 103. Furthermore, positioning the wheel support assemblies 103 outside the perimeter 201 of the substantially cylindrical first base member 101, on the arms 102a, 102b, and 102c, provides greater stability and decreases the incidences of tipping.

Roller bearings 106 positioned along an inner periphery 104b of the substantially cylindrical second base member 104 exemplarily illustrated in FIG. 1A, facilitate the omnidirectional movement of the spherical wheels 105 within their respective wheel support assemblies 103. Each roller bearing 106 is securely seated within a housing 106c as exemplarily illustrated in FIGS. 4C-4D. The housings 106c that accommodate the roller bearings 106 are disposed along an interior surface 401a of a sidewall 401 of the wheel support assembly 103 as exemplarily illustrated in FIG. 4B.

Figure 4C:
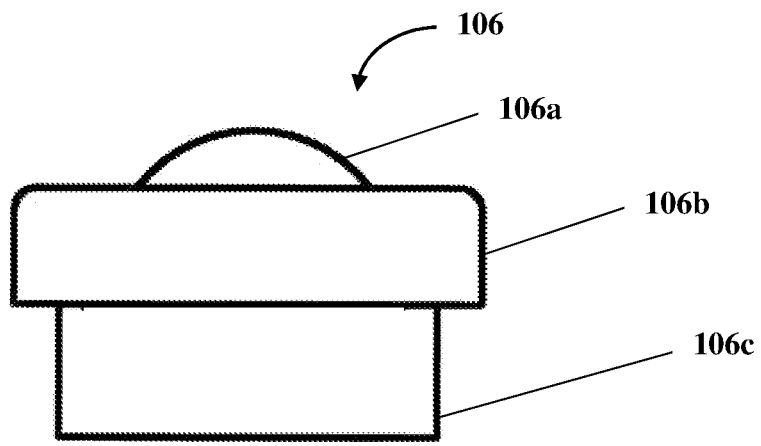
FIG. 4C exemplarily illustrates a side view of a roller bearing configured to secure and move a spherical wheel of the wheel support assembly of the all-terrain load transport system.
Figure 4D:
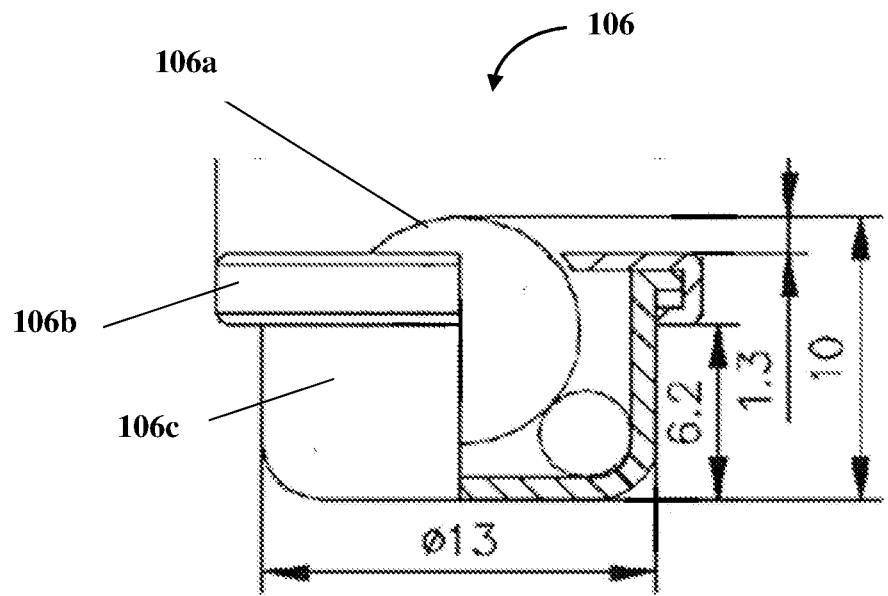
FIG. 4D exemplarily illustrates a partial sectional view of the roller bearing shown in FIG. 4C.

FIG. 4C exemplarily illustrates a side view of a roller bearing 106 configured to secure and move the spherical wheel 105 of the wheel support assembly 103 of the all-terrain load transport system 100. FIG. 4D exemplarily illustrates a partial sectional view of the roller bearing 106 shown in FIG. 4C. In an embodiment, the roller bearing 106 is a Roller CY-8H ball bearing. The roller bearing 106 comprises a rolling element 106a seated within a housing 106c. The housing 106c comprises a flanged opening 106b such that a portion of the housed rolling element 106a is exposed to contact the spherical wheel 105 as exemplarily illustrated in FIG. 4B.

In an embodiment, the pneumatic spherical wheels 105 made, for example, of rubber, are configured to offer maximum displacement over varied terrain conditions, for example, over an even terrain or an uneven terrain. As used herein, the term "displacement" refers to the amount of contact that a part of the spherical wheel 105 makes with the terrain. The spherical wheels 105 are also configured to provide maximum displacement over a wide range of terrains, for example, sand, dirt, mud, gravel, snow, grass, various paved or man-made surfaces, etc. The spherical wheels 105 do not dig, sink, or cut into the material of the terrain on which the spherical wheels 105 are traversing, making the spherical wheels 105 suitable for use in a wide range of terrains. The arms 102a, 102b, and 102c of the all-terrain load transport system 100 are removable. The arms 102a, 102b, and 102c are replaceable with arms of an alternative configuration to increase the height or clearance of the all-terrain load transport system 100. In an embodiment, the arms 102a, 102b, and 102c of an alternative configuration comprise spherical wheels 105 made of alternative wheel materials, for example, a non-marring material for fragile flooring. In another embodiment, the arms 102a, 102b, and 102c of an alternative configuration are of a compact dimension for storage or transport.

Figure 5:
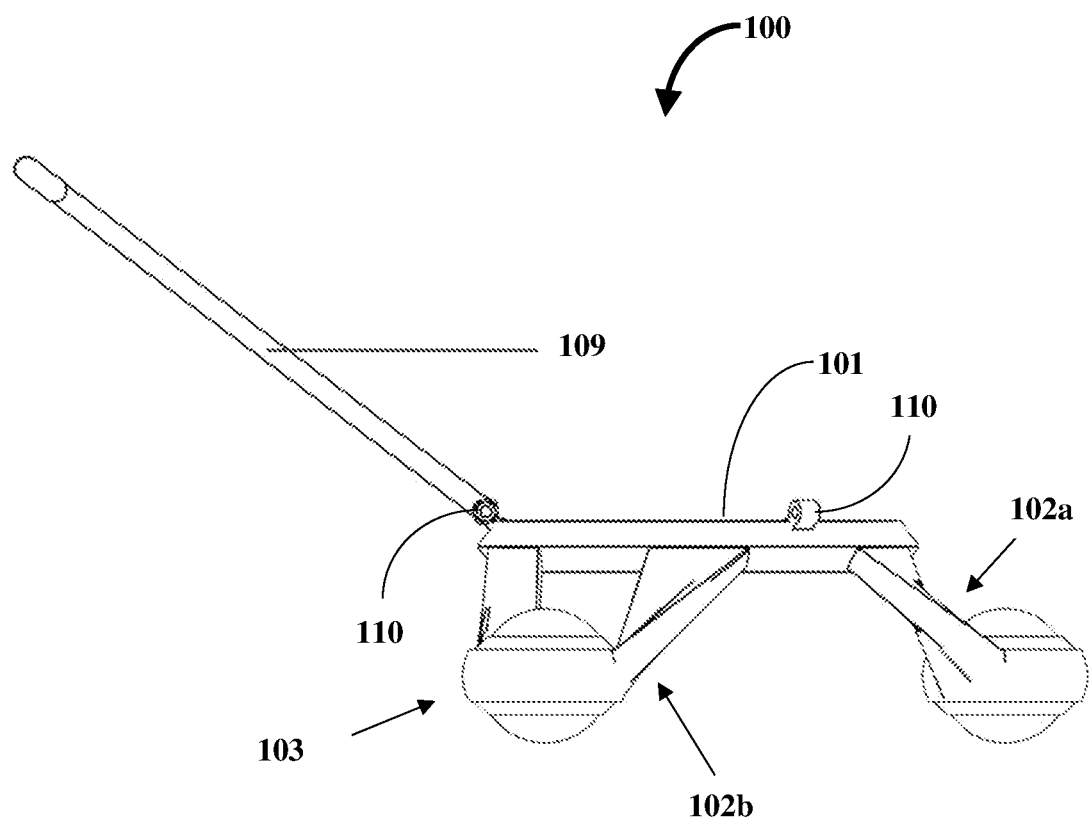
FIG. 5 exemplarily illustrates a left-side view of the all-terrain load transport system.

FIG. 5 exemplarily illustrates a left-side view of the all-terrain load transport system 100. The handle 109 of the all-terrain load transport system 100 is removably attached to an attachment member 110 disposed on the outer periphery 101a of the substantially cylindrical first base member 101. In an embodiment, supplementary attachment members 110 are disposed at multiple locations along the substantially cylindrical first base member 101. In an embodiment, the attachment members 110 are configured to receive or engage with one of a latching attachment, a hitching attachment, a securing means, etc., to securely retain one or more pieces of accessory equipment or load mounted on the all-terrain load transport system 100. The attachment members 110 of the all-terrain load transport system 100 are useful while transporting loads on an uneven terrain. The substantially cylindrical first base member 101, the arms 102a, 102b, and 102c, and the wheel support assemblies 103 form the foundation of the all-terrain load transport system 100, thereby allowing usage of the all-terrain load transport system 100 as a multi-utility equipment system and a transport vehicle, and allowing the portability of a multitude of applications. The intended initial applications for the all-terrain load transport system 100 comprise, for example, a paint sprayer, a composter, a dumpcart, a pressure sprayer, a beverage and food cooler, an air compressor, a vacuum cleaning equipment, etc. The all-terrain load transport system 100 functions as a load bearing omnidirectional platform or accessory equipment platform based on user requirement as exemplarily illustrated in FIGS. 6-13.

In an embodiment, an inner diameter of the substantially cylindrical first base member 101 of the all-terrain load transport system 100 is, for example, about 10 inches. In another embodiment, the all-terrain load transport system 100 comprises multiple substantially cylindrical first base members 101, each having a different inner diameter. For example, if the all-terrain load transport system 100 comprises five substantially cylindrical first base members 101, the inner diameter of the smallest substantially cylindrical first base member 101 is less than about 10 inches, and the inner diameter of the largest substantially cylindrical first base member 101 is more than about 15 inches. In an embodiment, the substantially cylindrical first base member 101 is radially adjustable to securely mount equipment having different peripheral diameters. In another embodiment, the interior space 114 defined by the substantially cylindrical first base member 101 exemplarily illustrated in FIG. 1A and FIG. 2, is tapered inward slightly from top to bottom, making an accessory equipment disposed within the space 114 defined by the substantially cylindrical first base member 101 similar to seating a cork or a stopper in a bottle. The weight of the accessory equipment or downforce keeps the accessory equipment seated within the space 114, translating to a lowered center of gravity thereby improving the overall stability of the all-terrain load transport system 100. In an embodiment, a lip 113 is provided on a substantially mid-portion or a substantially lower portion of the cylindrical first base member 101 as exemplarily illustrated in FIG. 1A, FIG. 1C, FIG. 1H, FIG. 2, and FIG. 4A, to limit downward travel or movement of the mounted accessory equipment. In an embodiment, the lip 113 is keyed or grooved to align the accessory equipment to the all-terrain load transport system 100. In another embodiment, instead of the lip 113, a platform is provided on the cylindrical first base member 101 to limit downward travel or movement of the mounted accessory equipment.

Figure 6:
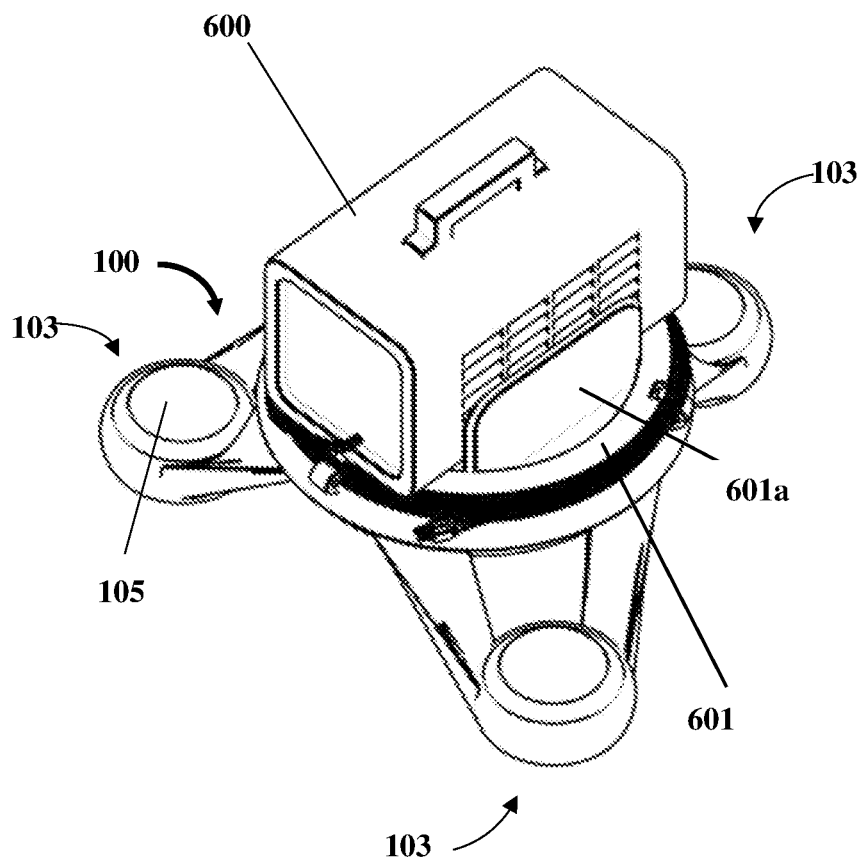
FIG. 6 exemplarily illustrates a top perspective view of a welding accessory mounted on the all-terrain load transport system.

FIG. 6 exemplarily illustrates a top perspective view of a welding accessory 600 mounted on the all-terrain load transport system 100. In an embodiment, the all-terrain load transport system 100 is fitted with a circular support platform 601 configured to receive and mount a piece of accessory equipment, for example, the welding accessory 600, on the all-terrain load transport system 100. The circular support platform 601 is secured to the attachment members 110 using fasteners 110a exemplarily illustrated in FIG. 1A. Typically, transportation of tools or accessories such as the welding accessory 600 typically require multiple workers to carry these tools or accessories on their shoulders across distances to a location where the tools or accessories are to be used. Some of the tools or accessories may be long and heavy requiring substantial physical labor, which causes unnecessary strain on the back, neck, and shoulders of the workers. As such, the provision of the circular support platform 601 allows carrying of heavy or bulky welding accessories or similar tools across locations while reducing the risk of personal injury. In an embodiment, the circular support platform 601 is provided in various diameters or with additional grooves or clamping members 601a in a kit along with the all-terrain load transport system 100, thereby allowing tools of various shapes and sizes to be securely mounted onto the all-terrain load transport system 100. The roller bearings 106 positioned along the inner periphery 104b of the substantially cylindrical second base member 104 of each wheel support assembly 103 in the all-terrain load transport system 100 exemplarily illustrated in FIGS. 1A-1B and FIG. 2, facilitates omnidirectional movement of the spherical wheel 105 in each wheel support assembly 103, thereby allowing transportation of the welding accessory 600 mounted on the all-terrain load transport system 100.

Figure 7:
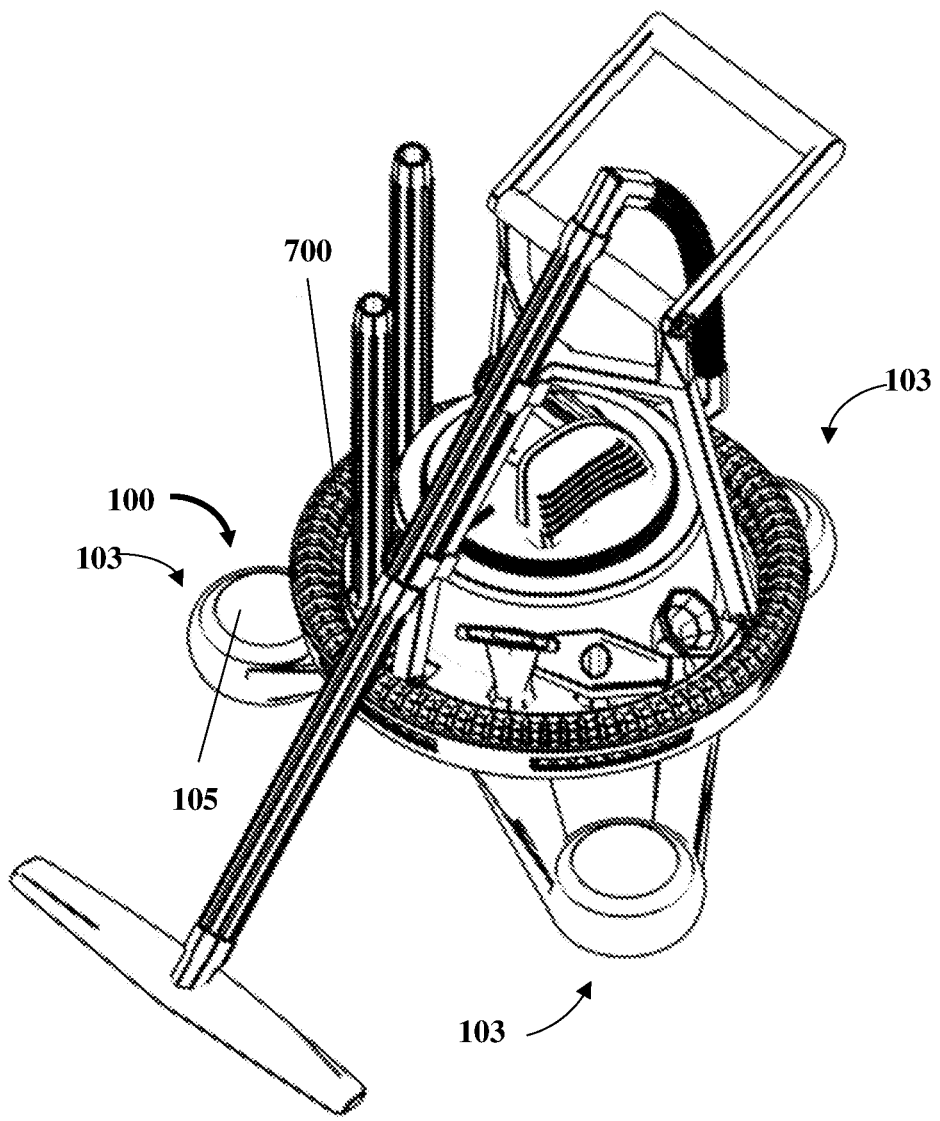
FIG. 7 exemplarily illustrates a top perspective view of a vacuum cleaning accessory mounted on the all-terrain load transport system.
Figure 8:
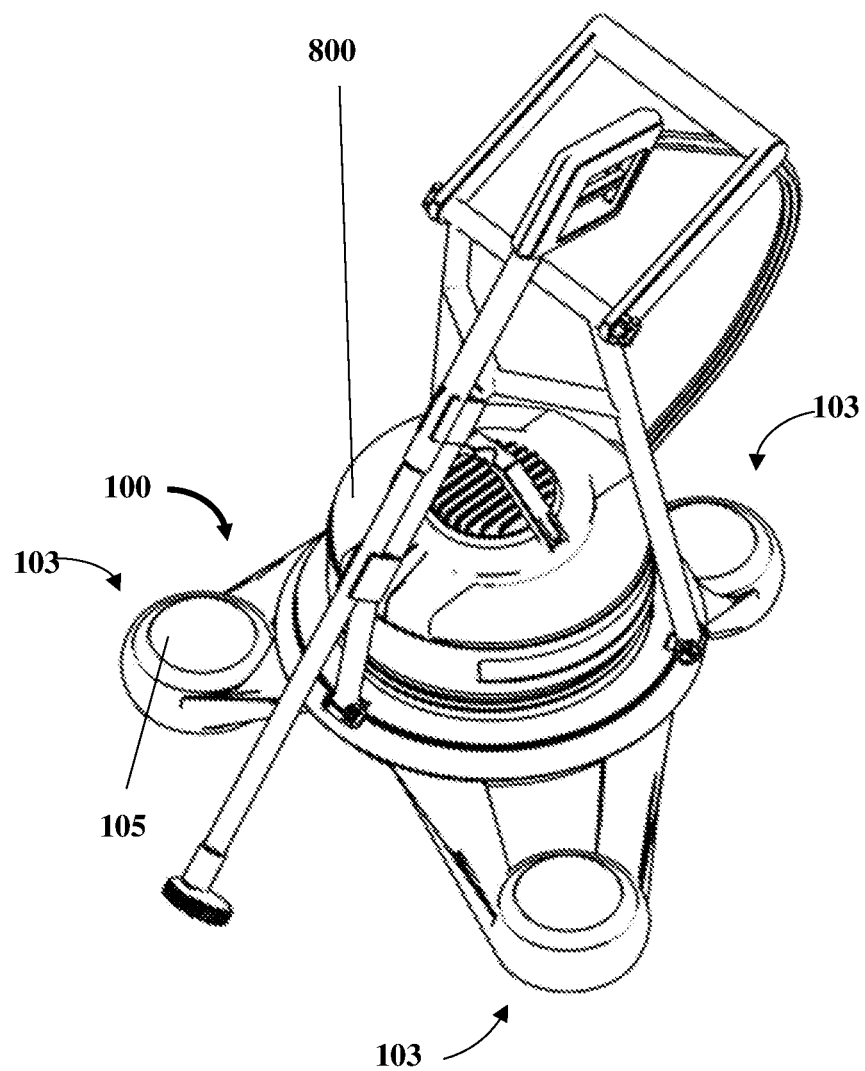
FIG. 8 exemplarily illustrates a top perspective view of a pressure washing accessory mounted on the all-terrain load transport system.
Figure 9:
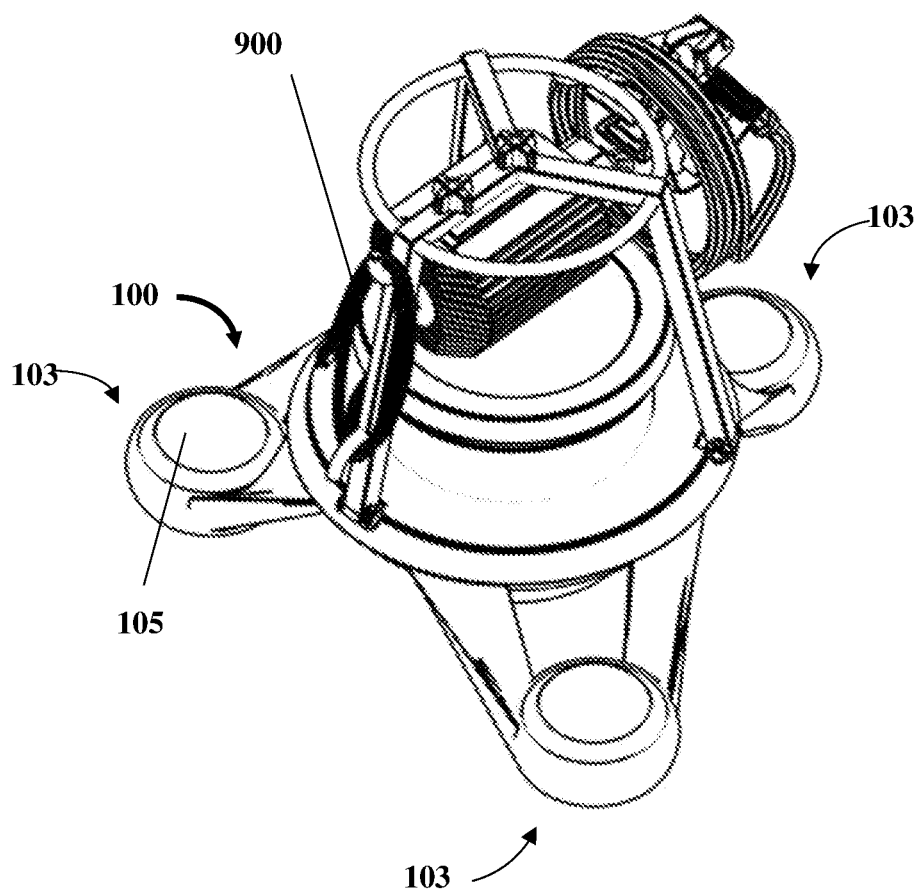
FIG. 9 exemplarily illustrates a top perspective view of an airless paint spraying accessory mounted on the all-terrain load transport system.
Figure 10:
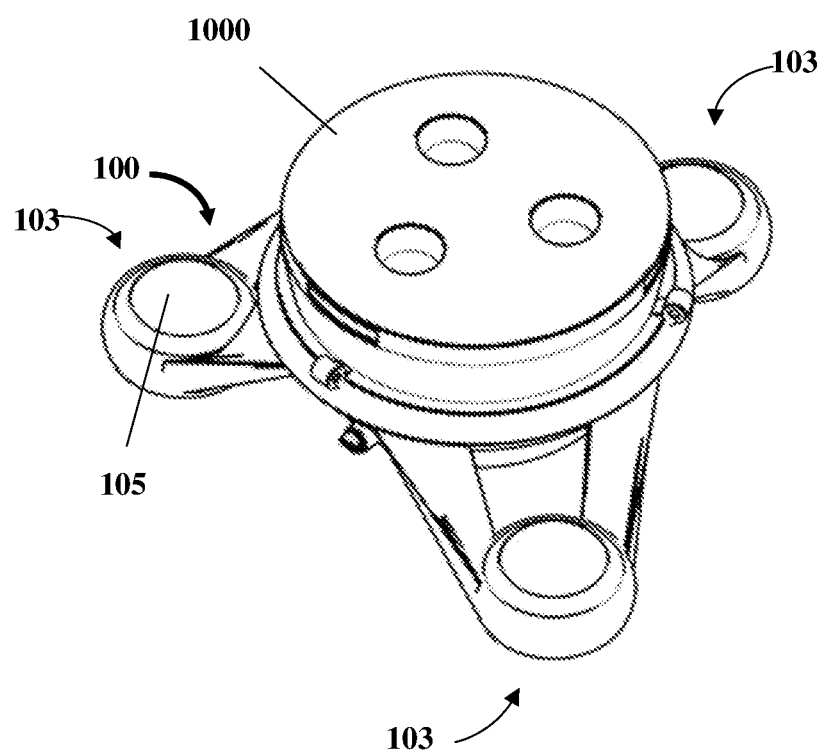
FIG. 10 exemplarily illustrates a top perspective view of a beverage cooling accessory mounted on the all-terrain load transport system.
Figure 11:
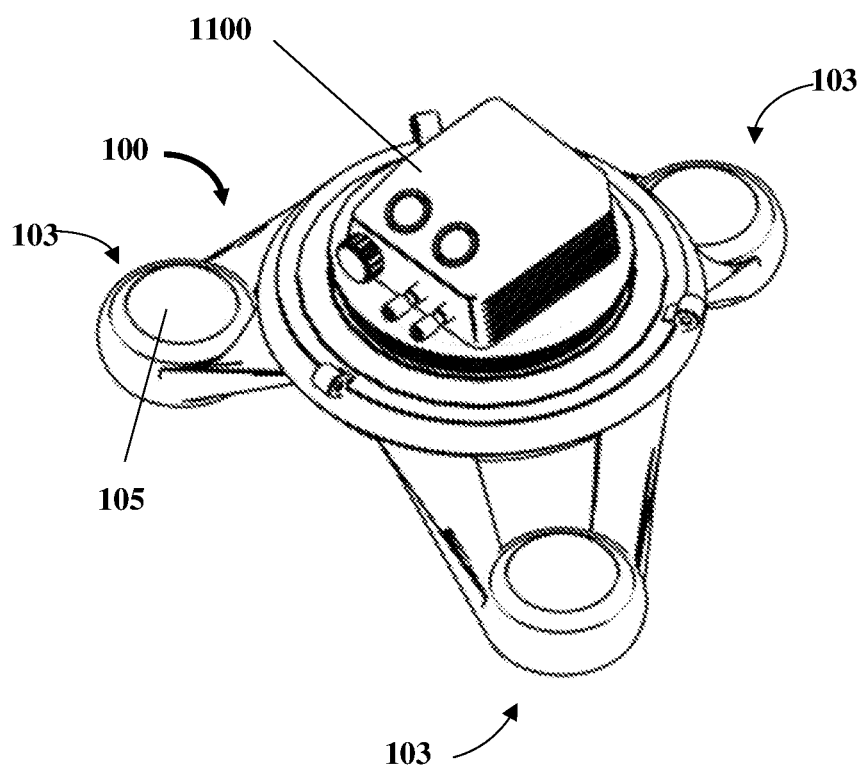
FIG. 11 exemplarily illustrates a top perspective view of an air compressor accessory mounted on the all-terrain load transport system.
Figure 12:
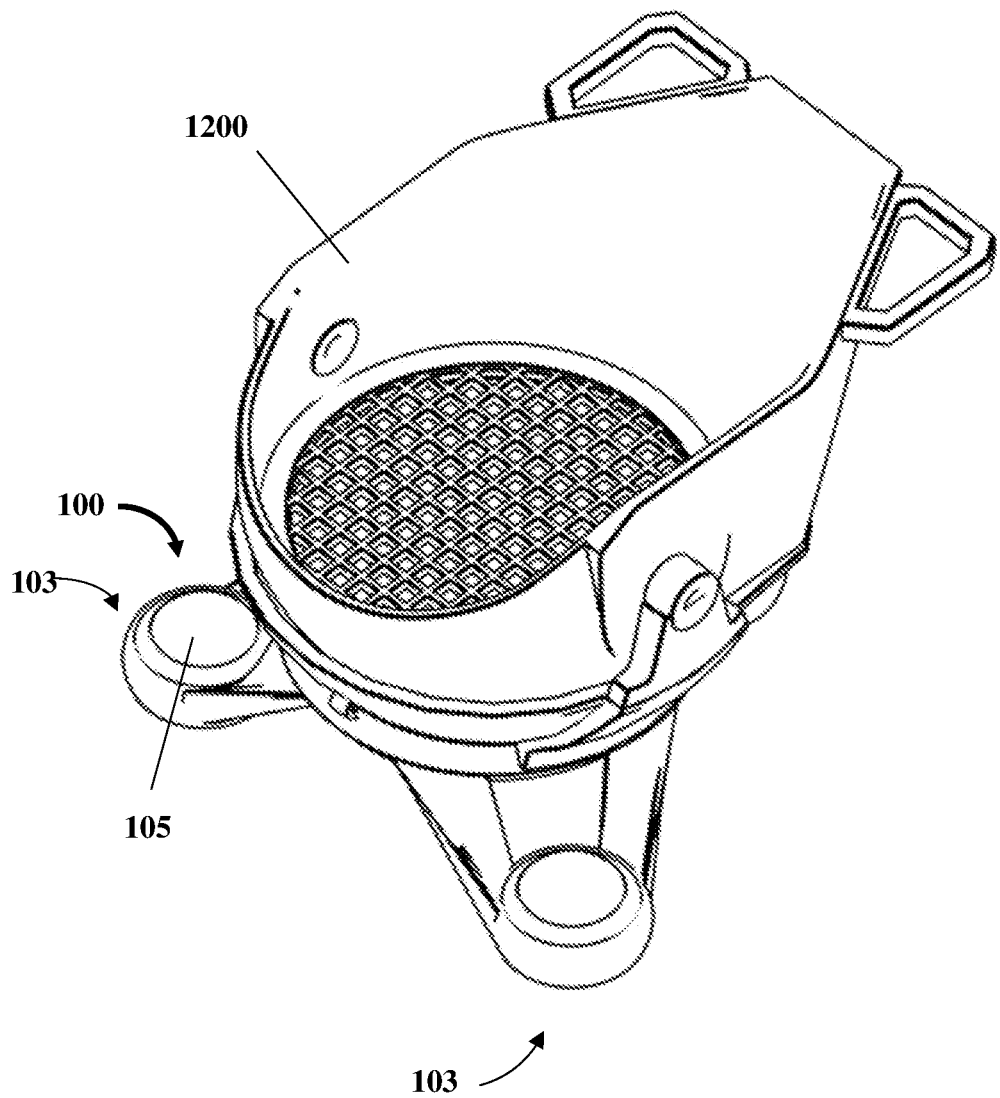
FIG. 12 exemplarily illustrates a top perspective view of a wheelbarrow accessory mounted on the all-terrain load transport system.
Figure 13:
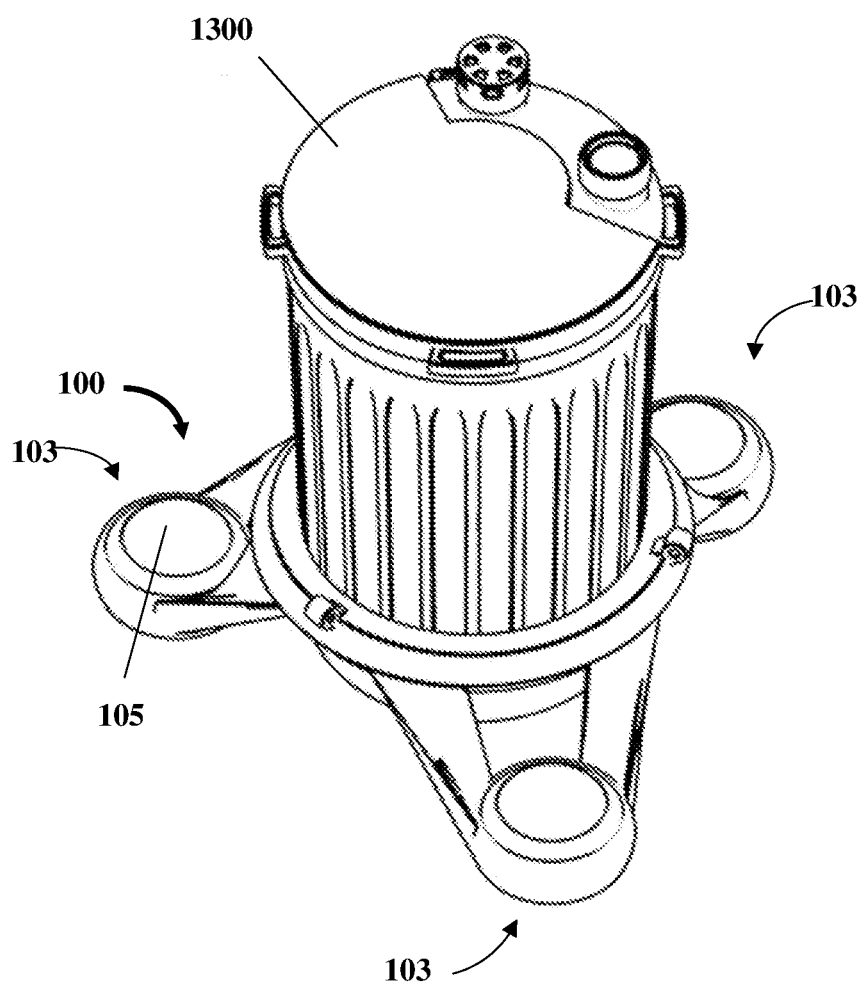
FIG. 13 exemplarily illustrates a top perspective view of a trash can accessory mounted on the all-terrain load transport system.

FIG. 7 exemplarily illustrates a top perspective view of a vacuum cleaning accessory 700 mounted on the all-terrain load transport system 100. FIG. 8 exemplarily illustrates a top perspective view of a pressure washing accessory 800 mounted on the all-terrain load transport system 100. FIG. 9 exemplarily illustrates a top perspective view of an airless paint spraying accessory 900 mounted on the all-terrain load transport system 100. FIG. 10 exemplarily illustrates a top perspective view of a beverage cooling accessory 1000 mounted on the all-terrain load transport system 100. FIG. 11 exemplarily illustrates a top perspective view of an air compressor accessory 1100 mounted on the all-terrain load transport system 100. FIG. 12 exemplarily illustrates a top perspective view of a wheelbarrow accessory 1200 or a yard cart mounted on the all-terrain load transport system 100. FIG. 13 exemplarily illustrates a top perspective view of a trash can accessory 1300 or a composter mounted on the all-terrain load transport system 100. In an embodiment, the trash can accessory 1300 is solar powered and configured to store harvested energy in a battery or similar power source. The roller bearings 106 positioned along the inner periphery 104b of the substantially cylindrical second base member 104 of each wheel support assembly 103 in the all-terrain load transport system 100 exemplarily illustrated in FIGS. 1A-1B and FIG. 2, facilitates omnidirectional movement of the spherical wheel 105 in each wheel support assembly 103, thereby allowing transportation of each individual accessory 700, 800, 900, 1000, 1100, 1200, or 1300 mounted on the all-terrain load transport system 100.

The maneuverability of the all-terrain load transport system 100 allows a 360-degree turning radius for navigating through tight spots or narrow spaces. Furthermore, the low center of gravity makes the all-terrain load transport system 100 less prone to tipping and therefore compact and robust while towing a mounted accessory or tool to a location. Moreover, the resilient omnidirectional spherical wheels 105 of the all-terrain load transport system 100 are capable of handling diverse terrains that may be encountered at a work location or a remote site. In an embodiment, the all-terrain load transport system 100 is configured to be transported in a standard kit comprising reusable or recyclable components and accessories. As such, the provision of the all-terrain load transport system 100 at work locations saves valuable time required for procedures such as installation, repair, routine maintenance, etc. In an embodiment, the kit comprises several accessories such as vertical telescopic frames, cylindrical support frames, clamping members, fasteners, etc., provided with the all-terrain load transport system 100 to allow mounting of accessories or equipment of different geometric configurations on the all-terrain load transport system 100. In an embodiment, the accessories or components provided in the kit are made by an additive manufacturing process, for example, three-dimensional (3D) printing. In another embodiment, the accessories or components are manufactured using a conventional plastic molding process, for example, injection molding. In an embodiment, the components are manufactured from metals such as aluminum and the like for increased strength and durability. In this embodiment, the components of the all-terrain load transport system 100 are spray-coated or coated with anti-corrosive coatings.

In an embodiment, the all-terrain load transport system 100 further comprises onboard electronics for providing an improved user experience. In this embodiment, the all-terrain load transport system 100 comprises one or more processors, microcontrollers, and/or printed circuit boards (PCBs) in addition to sensors configured to detect one or more parameters in relation to the all-terrain load transport system 100. The processors, the microcontrollers, and/or the PCBs are powered, for example, using power sources such as batteries, or using rechargeable/regenerative battery units that draw power from solar panels or other energy harvesting systems mounted on the all-terrain load transport system 100. In another embodiment, the all-terrain load transport system 100 comprises large and powerful battery packs capable of delivering varying voltage outputs of both alternating current (AC) and direct current (DC) power. In an embodiment, these voltage outputs are configured to provide relatively high levels of DC power for powering equipment that is attached to various powered attachment points on the all-terrain load transport system 100, while also being configured to provide AC power to function as a generator for tools mounted on the all-terrain load transport system 100. As such, the all-terrain load transport system 100, in accordance with the disclosure herein, is configured to deliver a relatively large amount of power, for example, sufficient to supply power to powered equipment and accessories coupled to the powered attachment points on the all-terrain load transport system 100. This supply of power and capability at a work site allows workers at a work site to accomplish tasks on site without the use of gas-powered equipment, extension cords, lifting/hoisting equipment, excessive manual labor, etc., thereby benefitting the work sites that have limited access to an external power supply which is not easily accessible.

In an exemplary implementation, the sensors comprise proximity sensors, motion sensors, load sensors, etc., configured to detect parameters such as the proximity of other objects to the all-terrain load transport system 100, the load mounted on the all-terrain load transport system 100, etc. In an embodiment, the detected parameters are indicated to a user using haptic feedback, an audio notification, or a visual indication via a graphic user interface or a display unit. In an embodiment, the detected parameters are further transmitted to a central database, or a receiving unit configured within a similar all-terrain load transport system 100, or a computing unit such as a personal computer, a laptop, and/or a smartphone, for processing, analytics, and executing control actions. Based on the detected parameters at a work site terrain, the all-terrain load transport system 100 is conveniently maneuvered through standard sized doorways, aisles, hallways, tight turns, etc. In some implementations, the all-terrain load transport system 100 operates in multiple modes comprising, for example, a follow mode and other modes that allow additional flexibility and adaptability in the use of the all-terrain load transport system 100. In various embodiments, the all-terrain load transport system 100 is remotely controlled and/or monitored and the data received therefrom is analyzed and processed to optimize the operation of the all-terrain load transport system 100.

The foregoing examples and illustrative implementations of various embodiments have been provided merely for explanation and are in no way to be construed as limiting of the all-terrain load transport system 100 disclosed herein. While the all-terrain load transport system 100 has been described with reference to various embodiments, it is understood that the words, which have been used herein, are words of description and illustration, rather than words of limitation. Furthermore, although the all-terrain load transport system 100 has been described herein with reference to particular means, materials, techniques, and embodiments, the all-terrain load transport system 100 is not intended to be limited to the particulars disclosed herein; rather, the all-terrain load transport system 100 extends to all functionally equivalent structures, methods and uses, such as are within the scope of the appended claims. While multiple embodiments are disclosed, it will be understood by those skilled in the art, having the benefit of the teachings of this specification, that the all-terrain load transport system 100 disclosed herein is capable of modifications and other embodiments may be effected and changes may be made thereto, without departing from the scope and spirit of the all-terrain load transport system 100 disclosed herein.

I claim:

1. An all-terrain load transport system comprising:
   a substantially cylindrical first base member;
   at least three pairs of arms, wherein each of said at least three pairs of arms are detachably attached to bottom of said substantially cylindrical first base member, and wherein said at least three pairs of arms extend outward and away from a longitudinal axis of said substantially cylindrical first base member; and
   a wheel support assembly comprising:
      a substantially cylindrical second base member extending from an end of said each pair of said at least three pairs of said arms, wherein said substantially cylindrical second base member comprises an opening for receiving a spherical wheel; and
      a set of roller bearings, wherein each roller bearing comprises a housing, and a rolling element seated within said housing, wherein said housing comprises a flanged opening that facilitates a portion of said housed rolling element to be exposed for contacting said spherical wheel; and
   wherein design comprising said substantially cylindrical second base member disposed in a horizontal plane parallel to a ground surface, said set of roller bearings disposed on said substantially cylindrical second base member, and said spherical wheel configured to move omni rotationally within said opening in said substantially cylindrical second base member, ensures placement of center of gravity of said all-terrain load transport system proximal to or suspended at center of said all-terrain load transport system, thereby positioning a gravitational load below a center point of each wheel support assembly, and making said all-terrain load transport system compact, robust, and less prone to tipping.

2. The all-terrain load transport system of claim 1, wherein said wheel support assembly is fixed at an end of said each pair of said at least three pairs of said arms distal from said outer periphery of said substantially cylindrical first base member.

3. The all-terrain load transport system of claim 1, wherein said wheel support assembly further comprises:
   a top dust seal seated proximal to a top surface of said substantially cylindrical second base member; and
   a bottom dust seal seated proximal to a bottom surface of said substantially cylindrical second base member, wherein said top dust seal and said bottom dust seal are configured to prevent an ingress of particulate matter into said space defined by said substantially cylindrical second base member.

4. The all-terrain load transport system of claim 1, further comprising a handle removably attached to an attachment member disposed on said outer periphery of said substantially cylindrical first base member.

5. The all-terrain load transport system of claim 1, wherein said substantially cylindrical first base member defines a space for receiving at least one piece of accessory equipment.

6. The all-terrain load transport system of claim 1, further comprising one or more attachment members disposed on said outer periphery of said substantially cylindrical first base member, and wherein said one or more attachment members are configured to removably attach at least one piece of accessory equipment to the substantially cylindrical first base member.

7. The all-terrain load transport system of claim 1, wherein said wheel support assembly of said each pair of said at least three pairs of said arms is positioned at vertices of an imaginary polygon coaxial to a longitudinal axis of said substantially cylindrical first base member.

8. The all-terrain load transport system of claim 7, wherein said imaginary polygon is an equilateral triangle.

9. The all-terrain load transport system of claim 1, wherein said spherical wheel is made of a resilient material.

10. An all-terrain load transport system, comprising:
    a handle removably attached to an attachment member disposed on an outer periphery of a substantially cylindrical first base member;
    said substantially cylindrical first base member defining a space configured to receive at least one piece of accessory equipment; and
    at least three pairs of arms, wherein each of said at least three pairs of arms are detachably attached to bottom of said substantially cylindrical first base member, and wherein said at least three pairs of arms extend outward and away from a longitudinal axis of said substantially cylindrical first base member; and
    a wheel support assembly comprising:
       a substantially cylindrical second base member extending from an end of said each pair of said at least three pairs of said arms, wherein said substantially cylindrical second base member comprises an opening for receiving a spherical wheel; and
       a set of roller bearings disposed on said substantially cylindrical second base member, wherein each roller bearing comprises a housing, and a rolling element seated within said housing, wherein said housing comprises a flanged opening that facilitates a portion of said housed rolling element to be exposed for contacting said spherical wheel,
    wherein design comprising said substantially cylindrical second base member disposed in a horizontal plane parallel to a ground surface, said set of roller bearings disposed on said substantially cylindrical second base member, and said spherical wheel configured to move omni rotationally within said opening in said substantially cylindrical second base member, ensures placement of center of gravity of said all-terrain load transport system proximal to or suspended at center of said all-terrain load transport system, thereby positioning a gravitational load below a center point of each wheel support assembly, and making said all-terrain load transport system compact, robust, and less prone to tipping.

11. The all-terrain load transport system of claim 10, wherein said wheel support assembly further comprises:
a top dust seal seated proximal to a top surface of said substantially cylindrical second base member; and
a bottom dust seal seated proximal to a bottom surface of said substantially cylindrical second base member, wherein said top dust seal and said bottom dust seal are configured to prevent an ingress of particulate matter into said space defined by said substantially cylindrical second base member.

12. The all-terrain load transport system of claim 10, wherein said wheel support assembly is fixed at an end of said each pair of said at least three pairs of said arms distal from said outer periphery of said substantially cylindrical first base member.

13. The all-terrain load transport system of claim 10, wherein said spherical wheel is made of a resilient material comprising one of rubber, silicone, and a combination of rubber and silicone.

14. The all-terrain load transport system of claim 10, further comprising one or more supplementary attachment members disposed on said outer periphery of said substantially cylindrical first base member, and wherein said one or more attachment members are configured to removably attach said at least one piece of accessory equipment to said substantially cylindrical first base member.

\* \* \* \* \*